United States Patent
Kim et al.

(10) Patent No.: US 9,918,335 B2
(45) Date of Patent: *Mar. 13, 2018

(54) PDCCH MONITORING METHOD AND APPARATUS IN A CARRIER JUNCTION SYSTEM

(71) Applicant: LG ELECTRONICS INC., Seoul (KR)

(72) Inventors: Soyeon Kim, Anyang-si (KR); Jinmin Kim, Anyang-si (KR); Jaehoon Chung, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,338

(22) Filed: Dec. 5, 2016

(65) Prior Publication Data

US 2017/0086220 A1 Mar. 23, 2017

Related U.S. Application Data

(63) Continuation of application No. 14/484,035, filed on Sep. 11, 2014, now Pat. No. 9,516,670, which is a
(Continued)

(30) Foreign Application Priority Data

Apr. 7, 2011 (KR) .......................... 10-2011-0032138

(51) Int. Cl.
*H04B 7/00* (2006.01)
*H04W 72/12* (2009.01)
(Continued)

(52) U.S. Cl.
CPC ....... *H04W 72/1289* (2013.01); *H04L 1/0046* (2013.01); *H04L 5/001* (2013.01);
(Continued)

(58) Field of Classification Search
CPC ......... H04W 72/1289; H04W 72/1294; H04W 72/1278; H04W 88/02; H04W 88/08;
(Continued)

(56) References Cited

U.S. PATENT DOCUMENTS 8,351,974 B2    1/2013  Ahn et al.
8,867,519 B2*  10/2014  Kim ..................... H04L 5/0007
                                                         370/310.2
(Continued)

FOREIGN PATENT DOCUMENTS

CN    101610564 A    12/2009
EP      2104294 A2     9/2009
(Continued)

OTHER PUBLICATIONS

ASUSTeK, "Blind Decoding in LTE-Advanced," 3GPP TSG RAN WG1 Meeting #58, R1-093280, Agenda Item 15.4, Shenzhen, P.R. China, Aug. 24-28, 2009, 3 pages.
(Continued)

*Primary Examiner* — Brenda H Pham
(74) *Attorney, Agent, or Firm* — Birch, Stewart, Kolasch & Birch, LLP

(57) ABSTRACT

A method is provided for receiving a downlink control information (DCI) from a base station (BS) by a user equipment (UE) in a wireless communication system. The UE monitors a plurality of Physical Downlink Control Channel (PDCCH) candidates having a cyclic redundancy check (CRC) scrambled by a cell radio network temporary identifier (C-RNTI) and having a same payload size in a common search space and a UE-specific search space on a primary cell to receive the DCI from the BS. The common search space and the UE-specific search space are overlapped. When the UE is configured with a carrier indicator field (CIF), determining, by the UE, that only a PDCCH in
(Continued)

the common search space is transmitted by the BS from among the plurality of PDCCH candidates. The UE receives a Physical Downlink Shared Channel (PDSCH) corresponding to the PDCCH in the common search space.

10 Claims, 21 Drawing Sheets

Related U.S. Application Data continuation of application No. 13/640,278, filed as application No. PCT/KR2011/002462 on Apr. 7, 2011, now Pat. No. 8,867,519.

(60) Provisional application No. 61/321,845, filed on Apr. 7, 2010.

(51) Int. Cl.
*H04L 5/00* (2006.01)
*H04L 1/00* (2006.01)
*H04L 29/08* (2006.01)
*H04W 88/02* (2009.01)
*H04W 88/08* (2009.01)

(52) U.S. Cl.
CPC .......... *H04L 5/0005* (2013.01); *H04L 5/0007* (2013.01); *H04L 5/0053* (2013.01); *H04W 72/1278* (2013.01); *H04W 72/1294* (2013.01); *H04L 69/324* (2013.01); *H04W 88/02* (2013.01); *H04W 88/08* (2013.01)

(58) Field of Classification Search
CPC ....... H04L 5/007; H04L 5/001; H04L 5/0053; H04L 5/0005; H04L 1/0046; H04L 69/324
USPC .............................. 370/310.2, 338, 328, 349
See application file for complete search history.

(56) References Cited

U.S. PATENT DOCUMENTS

| 9,516,670 | B2* | 12/2016 | Kim ...................... H04L 5/0007 |
| 2009/0088148 | A1 | 4/2009 | Chung et al. |
| 2009/0238091 | A1 | 9/2009 | Kim et al. |
| 2010/0322158 | A1 | 12/2010 | Lee et al. |
| 2011/0205978 | A1 | 8/2011 | Nory et al. |
| 2011/0228724 | A1 | 9/2011 | Gaal et al. |

FOREIGN PATENT DOCUMENTS

| KR | 10-0913473 B1 | 8/2009 |
| WO | WO 2009/041779 A1 | 4/2009 |
| WO | WO 2009/121025 A2 | 10/2009 |
| WO | WO 2009/135193 A1 | 11/2009 |
| WO | WO 2009/149647 A1 | 12/2009 |
| WO | WO 2010/011104 A2 | 1/2010 |
| WO | WO 2010/013959 A2 | 2/2010 |
| WO | WO 2010/018942 A2 | 2/2010 |

OTHER PUBLICATIONS

Research in Motion UK Limited, "Blind Decoding for Carrier Aggregation," 3GPP TSG RAN WG1 Meeting #58, R1-093295, Agenda Item 15.4, Shenzhen, China, Aug. 24-28, 2009, 3 pages.
Huawei, "Remaining Issues on Carrier Indicator Field," 3GPP TSG RAN WG1 meeting #60, R1-101047, San Francisco, USA, Feb. 22-26, 2010 (server date Feb. 16, 2010), 4 pages.
Philips, "DCI formats for carrier aggregation," 3GPP TSG RAN WG1 Meeting #60bis, R1-102248, Beijing, China, Apr. 12-16, 2010 (server date Apr. 6, 2010), 3 pages.
Research in Motion UK Limited, "Remaining issues for cross-carrier scheduling," 3GPP TSG RAN WG1 Meeting #60, R1-101621, San Francisco, USA, Feb. 22-26, 2010, pp. 1-3.
Zte, "Remaining issues on carrier indicator field," 3GPP TSG-RAN WG1 #60bis, R1-101811, Beijing, China, Apr. 12-16, 2010 (server date Apr. 6, 2010), 4 pages.

* cited by examiner

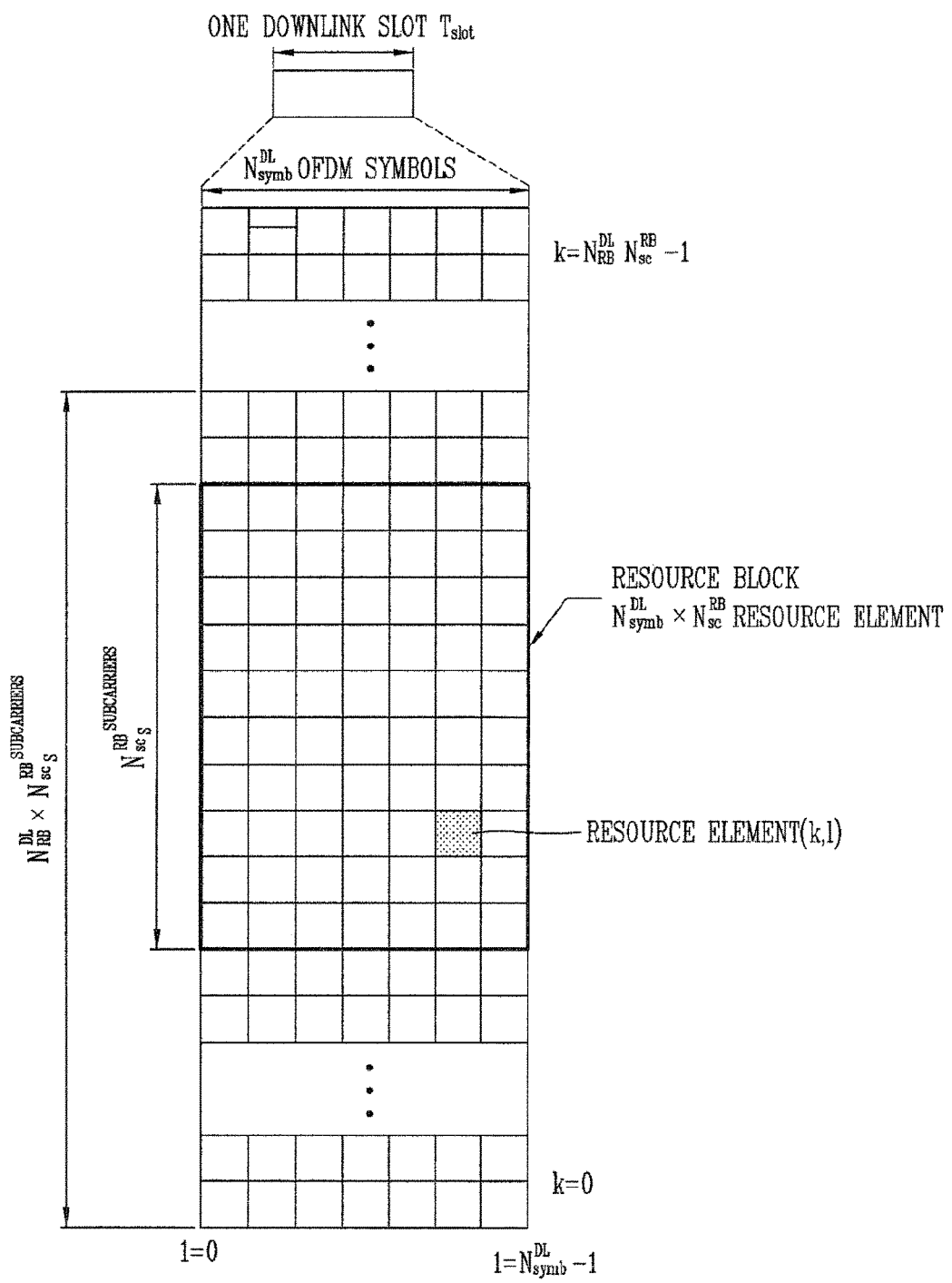

IF DCIs FOR CC#2,#3 ARE SAME SIZE, SEARCH SPACE FOR CC#2,#3 ARE SHARED

PDCCH MONITORING METHOD AND APPARATUS IN A CARRIER JUNCTION SYSTEM

CROSS-REFERENCE TO RELATED APPLICATIONS

This Application is a Continuation of U.S. patent application Ser. No. 14/484,035 filed on Sep. 11, 2014 (now U.S. Pat. No. 9,516,670 issued on Dec. 6, 2016), which is a Continuation of U.S. patent application Ser. No. 13/640,278 filed on Nov. 13, 2012 (now U.S. Pat. No. 8,867,519 issued on Oct. 21, 2014), which is filed as the National Phase of PCT/KR2011/002462 filed on Apr. 7, 2011, which claims the benefit under 35 U.S.C. § 119(e) to U.S. Provisional Application No. 61/321,845 filed on Apr. 7, 2010, and under 35 U.S.C. § 119(a) to Korean Patent Application No. 10-2011-0032138 filed on Apr. 7, 2011, all of which are hereby expressly incorporated by reference into the present application.

BACKGROUND OF THE INVENTION

In the following description, 3GPP LTE (3rd generation partnership projecting long term evolution, hereinafter abbreviated LTE) and 3GPP LTE-Advanced (hereinafter abbreviated LTE-A) communication systems are schematically explained as an example of a mobile communication system to which the present invention is applicable.

At least one cell exists in one eNode B. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. The eNode B controls data transmission and reception for a plurality of user equipments. The eNode B sends downlink scheduling information on downlink (DL) data to inform a corresponding user equipment of time/frequency region for transmitting data to the corresponding user equipment, coding, data size, HARQ (hybrid automatic repeat and request) relevant information and the like. In addition, the eNode B sends uplink scheduling information on uplink (UL) data to a corresponding user equipment to inform the corresponding user equipment of a time/frequency region available for the corresponding user equipment, coding, data size, relevant HARQ information and the like. An interface for user or control traffic transmission is usable between eNode Bs.

Wireless communication technology has been developed up to LTE based on WCDMA (wideband code division multiple access) but the demands and expectations of users and service providers are continuously rising. Since other radio access technologies are continuously developed, new technological evolution is required to remain competitive in the future. For this, reduction of cost per bit, service availability increase, flexible frequency band use, simple-structure and open interface, reasonable power consumption of user equipment and the like are required.

Recently, 3GPP is working on standardization of the next technology for LTE. In the present specification of the present invention, the next technology shall be named 'LTE-Advanced' or 'LTE-A'. Major differences between the LTE system and the LTE-A system lie in system bandwidth difference and relay introduction.

The LTE-A system has a goal of supporting a maximum broadband of 100 MHz. For this, the LTE-A system uses carrier aggregation or bandwidth aggregation to achieve a broadband using a plurality of frequency blocks. Carrier aggregation enables a plurality of frequency blocks to be used as one large logical frequency band to use a wider frequency band. A bandwidth of each frequency block can be defined based on a system block used by the LTE system. In addition, each frequency block is transmitted using a component carrier.

As a carrier aggregation technology is adopted in LTE-A, which is a next-generation communication technology, there is a need for a method for receiving, by a user equipment, a signal from an eNode B or a relay in a system which supports a plurality of carriers.

SUMMARY OF THE INVENTION

The present invention relates to a carrier junction system, and more particularly, to a method and apparatus for monitoring a physical downlink control channel (PDCCH) in a carrier junction system.

An object of the present invention devised to solve the problem lies in a method for resolving ambiguity in detection of downlink control information (DCI) in a user equipment by detection of a plurality of PDCCHs having the same size, in a section in which PDCCH search spaces overlap (completely or partly), in a carrier junction system.

The object of the present invention can be achieved by providing a method for monitoring a physical downlink control channel (PDCCH) in a carrier junction system, the method including monitoring a plurality of candidate PDCCHs in a section where a PDCCH search space of a first component carrier overlaps with a PDCCH search space of a second component carrier, and receiving downlink control information through a PDCCH having succeeded in blind decoding among the plurality of candidate PDCCHs, wherein the PDCCH having succeeded in the blind decoding is a common PDCCH including common control information, a PDCCH for a self-scheduling component carrier without a carrier indicator field (CIF), or a PDCCH for a primary component carrier.

Here, the monitoring performs blind decoding for the plurality of candidate PDCCHs, and the blind decoding performs CRC de-masking for each of the candidate PDCCHs using a radio network temporary identifier (RNTI).

Further, the monitoring monitors the plurality of candidate PDCCHs based on a PDCCH whose order of priority has been set in the overlapping section.

The method further includes receiving information on the PDCCH whose order of priority has been set from a base station.

Further, the PDCCH, whose order of priority has been set, is the PDCCH having succeeded in the decoding.

The PDCCH having succeeded in the decoding is a common PDCCH in case the PDCCH search space of the first component carrier is a common search space monitored by all user equipments (UEs) within a cell, and the PDCCH search space of the second component carrier is a UE-specific search space monitored by at least one of the UEs within the cell.

The PDCCH having succeeded in the decoding is a PDCCH without a carrier indicator field (CIF) in case both the PDCCH search space of the first component carrier and the PDCCH search space of the second component carrier are a UE-specific search space.

The common PDCCH is transmitted in the common search space of the first component carrier.

The first component carrier is a primary component carrier.

The primary component carrier is an uplink component carrier linked with a PDCCH monitoring component carrier where the PDCCH is transmitted, a component carrier having a first linkage with the PDCCH monitoring component carrier, or a downlink or uplink component carrier which becomes an object of self-scheduling in the PDCCH monitoring carrier.

In case there are a plurality of the PDCCH monitoring component carriers, the primary component carrier is defined for each of the plurality of PDCCH monitoring component carriers.

In another aspect of the present invention, there is provided a user equipment (UE) in a carrier aggregation system, the UE including a radio frequency (RF) unit for transmitting and receiving a radio signal, and a controller linked with the RF unit, wherein the controller monitors a plurality of candidate physical downlink control channels (PDCCHs) in a section where a PDCCH search space of a first component carrier overlaps with a PDCCH search space of a second component carrier, and controls the RF unit to receive downlink control information through a PDCCH having succeeded in blind decoding among the plurality of PDCCHs, wherein the PDCCH having succeeded in the blind decoding is a common PDCCH including common control information, a PDCCH for a self-scheduling component carrier without a carrier indicator field (CIF), or a PDCCH for a primary component carrier.

Here, the controller monitors the plurality of candidate PDCCHs using blind decoding, and the blind decoding performs CRC de-masking for each of the candidate PDCCHs using a radio network temporary identifier (RNTI).

The controller monitors the plurality of candidate PDCCHs based on a PDCCH whose order of priority has been set in the overlapping section.

The controller controls the RF unit to receive information on the PDCCH whose order of priority has been set from a base station.

The PDCCH, whose order of priority has been set, is the PDCCH having succeeded in the decoding.

The PDCCH having succeeded in the decoding is a common PDCCH in case the PDCCH search space of the first component carrier is a common search space monitored by all user equipments within a cell, and the PDCCH search space of the second component carrier is a UE-specific search space monitored by at least one of the user equipments within the cell.

The PDCCH having succeeded in the decoding is a PDCCH without a carrier indicator field (CIF) in case both the PDCCH search space of the first component carrier and the PDCCH search space of the second component carrier are a UE-specific search space.

The first component carrier is a primary component carrier.

According to the present invention, in a section where PDCCH search spaces overlap or are shared, the ambiguity of detection of DCIs having the same size in the overlapping or shared section can be resolved by performing blind decoding for a plurality of candidate PDCCHs based on predetermined PDCCHs using priority, etc.

BRIEF DESCRIPTION OF THE DRAWINGS

FIG. 4 illustrates a time-frequency resource grid structure of a downlink used in the present invention.

DETAILED DESCRIPTION OF THE EMBODIMENTS

Reference will now be made in detail to the preferred embodiments of the present invention, examples of which are illustrated in the accompanying drawings. It should be understood that the present invention is not limited solely to the following embodiment. The following description includes specific details for providing a full understanding of the present invention. However, it will be apparent to anyone skilled in the art that the present invention may also be embodied without such specific details. For example, the following detailed description is made under the assumption that the mobile telecommunications system corresponds to an IEEE 802.16 system. However, with the exception of the characteristic features of the IEEE 802.16 system, the present invention may also be applied to any other mobile telecommunications system.

In some cases, to avoid any ambiguity in the concept of the present invention, structures or devices of the disclosure may be omitted, or the embodiment of the present invention may be illustrated in the form of block views focusing on the essential functions of each structure and device. Also, wherever possible, the same reference numbers will be used throughout the drawings to refer to the same or like parts.

Accordingly, in the following description of the present invention, it is assumed that a user equipment collectively refers to mobile or fixed user-end equipment (or device), such as an AMS (Advanced Mobile Station), UE (User Equipment), MS (Mobile Station), and so on. Also, it is assumed that a base station collectively refers to a random node, such as a Node B, eNode B, Base Station, AP (Access Point), and so on, of a network end communicating with a terminal.

Generally, in a mobile communication system, a user equipment and a relay are able to receive information in downlink from a base station. In addition, the user equipment and the relay are able to transmit information in uplink as well. The information transmitted or received by the user equipment and the relay includes data and various kinds of control information. In addition, various physical channels exist according to a type usage of the information transmitted or received by the user equipment and the relay.

Figure 1:
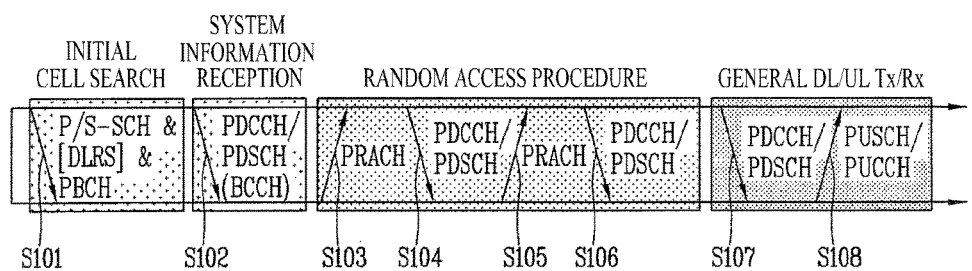
FIG. 1 illustrates physical channels used in a 3GPP system and a general signal transmission method using the channels.

FIG. 1 is a diagram explaining physical channels used for such a mobile communication system as 3GPP (3rd generation partnership project) system and a general signal transmitting method using the physical channels.

A user equipment, which is initially activated or which enters a new cell, performs an initial cell search for matching synchronization with a base station or the like (S101). For this, the user equipment matches the synchronization with the base station by receiving a primary synchronization channel (P-SCH) and a secondary synchronization channel (S-SCH) from the base station and then obtains such information as cell ID and the like. Subsequently, the user equipment is able to obtain intra-cell broadcast information by receiving a physical broadcast channel from the base station. Meanwhile, the user equipment is able to check a downlink channel status by receiving a downlink reference signal (DL RS) in the initial cell search step.

Having completed initial cell search, the user equipment is able to obtain further detailed system information by receiving a physical downlink control channel (PDCCH) and a physical downlink shared channel (PDSCH) according to the physical downlink control channel information (S102).

Meanwhile, the user equipment failing to complete access to the base station is able to perform such a random access procedure as steps S103 to S106 to complete access to the base station. For this, the user equipment transmits a feature sequence as a preamble via a physical random access channel (PRACH) (S103 and S105) and is then able to receive a response message in response to the random access via a physical downlink control channel and a physical downlink shared channel corresponding to the physical downlink control channel (S104 and S106). Subsequently, in case of contention based random access (except during handover), it is able to additionally perform such a contention resolution procedure.

Having performed the above procedures, the user equipment is able to perform general uplink/downlink signal transmission procedures including a physical downlink control channel/physical downlink shared channel reception (S107) and a physical uplink shared channel/physical uplink control channel (PUSCH/PUCCH) transmission (S108). The information transmitted by the UE to the base station through uplink or the information received by the UE from the base station includes a downlink/uplink ACK/NACK signal, a channel quality indicator (CQI), a precoding matrix index (PMI), a rank indicator (RI), etc. In the case of a 3GPP LTE system, the UE may transmit information such as the above mentioned CQI, RMI and RI information, etc. through the PUSCH and/or PUCCH.

Figure 2:
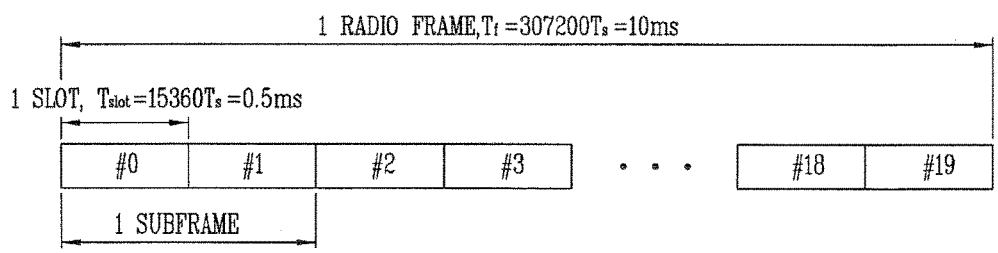
FIG. 2 illustrates a configuration of a radio frame used in a 3GPP LTE system which is an example of a mobile communication system.

FIG. 2 shows the structure of a radio frame used in the 3GPP LTE system as an exemplary mobile communication system.

Referring to FIG. 2, one radio frame has a length of 10 ms (327200 Ts) and includes ten subframes having an equal size. Each subframe has a length of 1 ms and includes two slots each having a length of 0.5 ms (15360 Ts). Here, Ts denotes a sampling time, which is represented as Tx=1/(15 kHz×2048)=3.2552×10−8 (approximately 33 ns). A slot includes a plurality of Orthogonal Frequency Division Multiplexing (OFDM) symbols or Single Carrier-Frequency Division Multiple Access (SC-FDMA) symbols in the time domain and a plurality of resource blocks in the frequency domain.

In the LTE system, one resource block includes 12 subcarriers×7(6) OFDM symbols or SC-FDMA symbols. A unit time for transmitting data, Transmit Time Interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

FIG. 3 shows the structures of uplink and downlink subframes in the 3GPP LTE system as an exemplary mobile communication system.

Figure 3A:
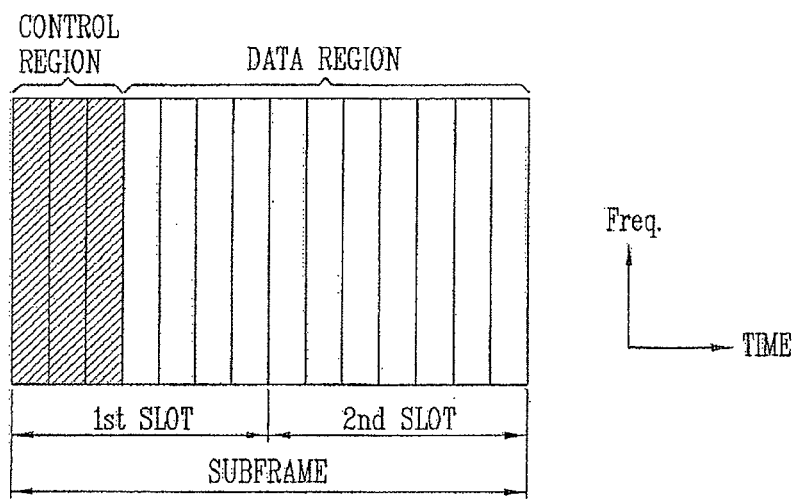
FIGS. 3(a) and 3(b) illustrate the configuration of a downlink and uplink subframe of a 3GPP LTE system which is an example of a mobile communication system.

Referring to FIG. 3(a), one downlink subframe includes two slots in the time domain. A maximum of three OFDM symbols located in a front portion of a first slot in the downlink subframe correspond to a control region allocated with control channels, and the remaining OFDM symbols correspond to a data region allocated with a Physical Downlink Shared Channel (PDSCH).

Examples of downlink control channels used in the 3GPP LTE include a Physical Control Format Indicator Channel (PCFICH), a Physical Downlink Control Channel (PDCCH), a Physical Hybrid-ARQ Indicator Channel (PHICH), etc. The PCFICH is transmitted at a first OFDM symbol of a subframe and carries information regarding the number of OFDM symbols (i.e., a control region size) used for transmission of control channels within the subframe. Control information transmitted over the PDCCH is referred to as downlink control information (DCI). The DCI includes uplink resource allocation information, downlink resource allocation information, and an uplink transmit power control command for arbitrary user equipment (UE) groups. The PHICH carries an acknowledgement/negative-acknowledgement (ACK/NACK) signal with respect to uplink Hybrid Automatic Repeat Request (HARQ). That is, an ACK/NACK signal with respect to uplink data sent from a UE is transmitted over the PHICH.

A description will be given of a PDCCH corresponding to a downlink physical channel below. The PDCCH will be described in more detail later with reference to FIGS. 5 to 8.

The PDCCH can carry a resource allocation and transmission format of a PDSCH (which may be referred to as a DL grant), resource allocation information of a PUSCH (which may be referred to as a UL grant), a set of transmit power control commands on individual UEs within an arbitrary UE group, activation of a Voice over Internet Protocol (VoIP), etc. A plurality of PDCCHs can be transmitted within a control region. A UE can monitor the PDCCHs. The PDCCH includes an aggregate of one or several consecutive Control Channel Elements (CCEs).

The PDCCH can be transmitted in the control region after subblock interleaving. A CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information carried on the PDCCH is called DCI. Table 1 shows DCI according to DCI format.

TABLE 1

| DCI Format | Description |
| --- | --- |
| DCI Format 0 | used for the scheduling of PUSCH |
| DCI Format 1 | used for the scheduling of one PDSCH codeword |
| DCI Format 1A | used for the compact scheduling of one PDSCH codeword and random access procedure initiated by a PDCCH order |
| DCI Format 1B | used for the compact scheduling of one PDSCH codeword with precoding information |
| DCI Format 1C | used for very compact scheduling of one PDSCH codeword |
| DCI Format 1D | used for the compact scheduling of one PDSCH codeword with precoding and power offset information |
| DCI Format 2 | used for scheduling PDSCH to UEs configured in closed-loop spatial multiplexing mode |
| DCI Format 2A | used for scheduling PDSCH to UEs configured in open-loop spatial multiplexing mode |
| DCI Format 3 | used for the transmission of TPC commands for PUCCH and PUSCH with 2-bit power adjustments |
| DCI Format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate uplink transmit power control (TPC) command for UE groups.

A method for mapping resources for transmission of a PDCCH by a base station in an LTE system will be briefly described below.

Generally, a base station may transmit scheduling allocation information and other control information through a PDCCH. The physical control channel may be transmitted to one aggregation or a plurality of continuous control channel elements (CCE). One CCE includes nine resource element groups (REG). The number of RBGs, which are not allocated to a physical control format indicator channel (PCFICH) or a physical hybrid automatic repeat request indicator channel (PHICH), is NREG. The CCE, which is available in the system, is from 0 to NCCE−1 (here, $N_{CCE}=\lfloor N_{REG}/9 \rfloor$). The PDCCH supports a multiple format as shown in Table 3 below. One PDCCH, which comprises n consecutive CCEs, starts from CCE, which performs i mod n=0 (here, i is CCE number). Multiple PDCCHs may be transmitted to one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, a base station may determine the PDCCH format according to the number of areas to which control information, etc. will be sent. The UE may reduce overhead by reading control information, etc. in CCE units. Likewise, even the relay may read control information, etc. in R-CCE units. In the LTE-A system, in order to transmit an R-PDCCH for an arbitrary relay, resource elements may be mapped in R-CCE (Relay-Control Channel Element) units.

Figure 3B:
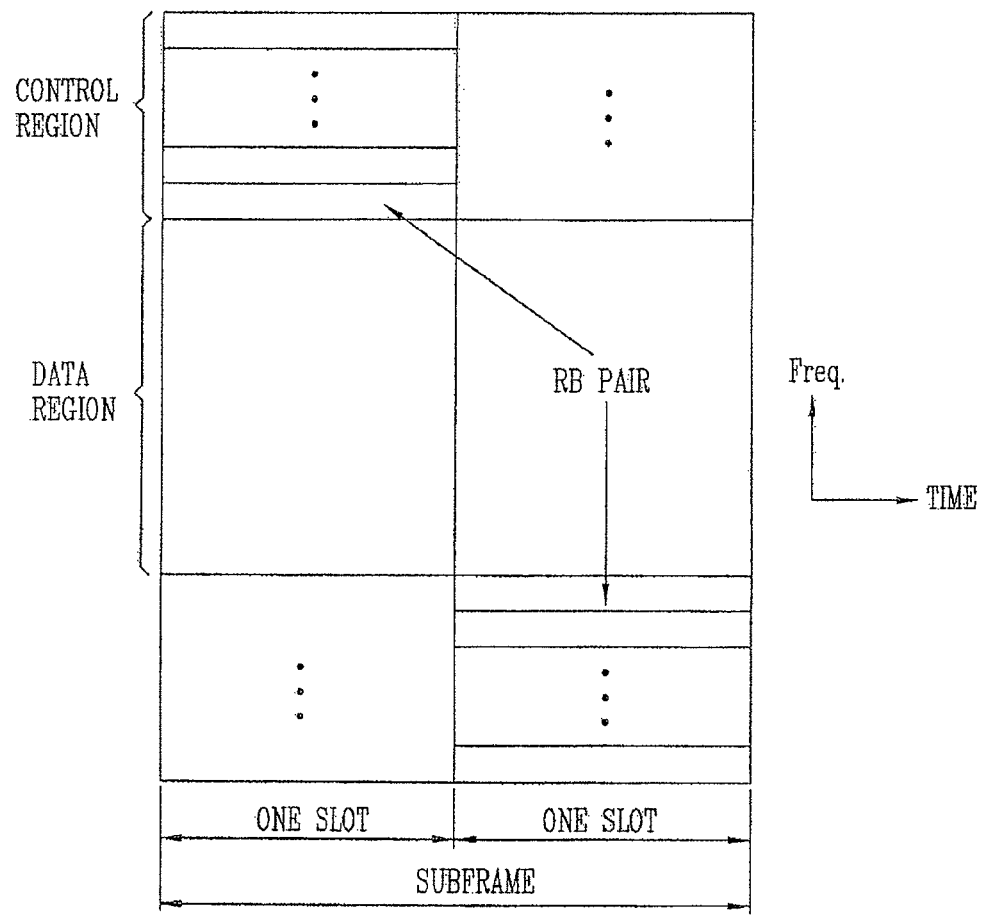

Referring to FIG. 3(b), an uplink subframe can be divided in the frequency domain into a control region and a data region. The control region is allocated with a PUCCH for carrying uplink control information. The data region is allocated with a PUSCH for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in two respective slots. The RB pair allocated to the PUCCH is frequency-hopped at a slot boundary.

FIG. 4 shows a downlink time-frequency resource grid structure used in the present invention.

A downlink signal transmitted in each slot may be described by a resource grid including $N_{RB}^{DL} \times N_{SC}^{RB}$ subcarriers and $S_{symb}^{DL}$ OFDM symbols. $N_{RB}^{DL}$ indicates the number of downlink resource blocks (RBs), $N_{SC}^{DL}$ represents the number of subcarriers which configure one RB, and $N_{symb}^{DL}$ indicates the number of OFDM symbols in one downlink slot. $N_{RB}^{DL}$ depends on a downlink transmission bandwidth set in a corresponding cell and needs to satisfy $N_{RB}^{min,DL} \leq N_{RB}^{DL} \leq N_{RB}^{max,DL}$. Here, $N_{RB}^{min,DL}$ indicates a minimum downlink bandwidth supported by a wireless communication system, and $N_{RB}^{max,RB}$ represents a maximum downlink bandwidth supported by the wireless communication system. While $N_{RB}^{min,DL}$ may be 6 and $N_{RB}^{max,RB}$ may be 110, they are not limited thereto. The number of OFDM symbols included in one slot may depend on the length of a Cyclic Prefix (CP) and a subcarrier interval. In case of multi-antenna transmission, one resource grid can be defined per antenna port.

An element in the resource grid for each antenna port is called a Resource Element (RE) and uniquely identified by an index pair (k, l) in a slot. Here, k indicates a frequency-domain index ranging from 0 to $N_{BR}^{DL} N_{SC}^{RB}-1$, and l indicates a time-domain index ranging from 0 to $N_{symb}^{DL}-1$.

An RB shown in FIG. 4 is used to describe the mapping relationship between a physical channel and REs. RBs may be classified into a physical RB (PRB) and a virtual RB (VRB). One PRB is defined as $N_{symb}^{DL}$ consecutive OFDM symbols in the time domain and $N_{SC}^{RB}$ consecutive subcarriers in the frequency domain. Here, $N_{symb}^{DL}$ and $N_{SC}^{RB}$ may be predetermined values. For example, $N_{symb}^{DL}$ and $N_{SC}^{RB}$ may have values as shown in the following Table 3. Accordingly, one PRB includes $N_{symb}^{DL} \times N_{sc}^{RB}$ REs. While one PRB can correspond to one slot in the time domain and correspond to 180 kHz in the frequency domain, it is not limited thereto.

TABLE 3

| Configuration | | $N_{SC}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | 12 | 6 |
| | Δf = 7.5 kHz | 24 | 3 |

One PRB has a value in the range of 0 to $N_{RB}^{DL}-1$ in the frequency domain. The relationship between a PRB number $n_{PRB}$ in the frequency domain and a resource element (k, l) in one slot satisfies $$n_{PRB} = \left\lfloor \frac{k}{N_{sc}^{RB}} \right\rfloor.$$

The VRB has a size equal to the PRB. The VRB can be classified into a localized VRB (LVRB) and a distributed VRB (DVRB). For each VRB type, a pair of VRBs in two slots of one subframe are allocated a single VRB number $n_{VRB}$.

The VRB may have a size equal to the PRB. For each of the LVRB and DVRB, a pair of VRB having a single VRB index (which may be referred to as a VRB number) are allocated to two slots in one subframe. In other words, $N_{RB}^{DL}$ VRBs which belong to the first one of two slots in one subframe are allocated with one of indexes in the range of 0 to $N_{RB}^{DL}-1$, and $N_{RB}^{DL}$ VRBs which belong to the second slot are also allocated with one of the indexes in the range of 0 to $N_{RB}^{DL}-1$.

The radio frame structure, the downlink subframe and uplink subframe, the time-frequency resource grid structure, etc. disclosed in FIGS. 2 to 4 may also be applied between the base station and the relay.

Hereinafter, a process, in which the base station sends the PDCCH to the UE, will be described.

Figure 5:
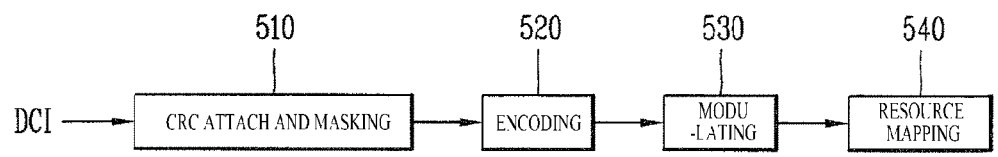
FIG. 5 is a block diagram illustrating the configuration of a PDCCH.

FIG. 5 illustrates a block diagram illustrating a configuration of a PDCCH.

The base station determines the PDCCH format according to the DCI to be transmitted to the UE, attaches the cyclic redundancy check (CRC) to the DCI, and masks a unique identifier (also referred to as a radio network temporary identifier (RNTI)) to the CRC according to the owner or the use of the PDCCH (510).

In case of a PDCCH for a specific UE, the UE's unique identifier, e.g., a cell-RNTI (C-RNTI) may be masked to the CRC. Further, in the case of the PDCCH for a paging message, a paging indication identifier, e.g., a paging-RNTI (P-RNTI) may be masked to the CRC. In the case of a PDCCH for system information, a system information-RNTI (SI-RNTI) may be masked to the CRC. A random access-RNTI (RARNTI) may be masked to the CRC to indicate a random access response which is a response to transmission of a random access preamble of the UE. In order to indicate the transmit power control (TPC) command for a plurality of UEs, a TPC-RNTI may be masked to the CRC.

If the C-RNTI is used, the PDCCH carries control information for a corresponding specific UE (referred to as UE-specific control information), and if another RNTI is used, the PDCCH carries common control information received by all or a plurality of UEs within the cell.

The CRC generates coded data by encoding the DCI (520). The encoding includes channel encoding and rate matching.

The coded data is modulated, thereby generating modulation symbols (530).

The modulation symbols are mapped to physical resource elements (RE) (540). Each of the modulation symbols is mapped to the RE.

Figure 6:
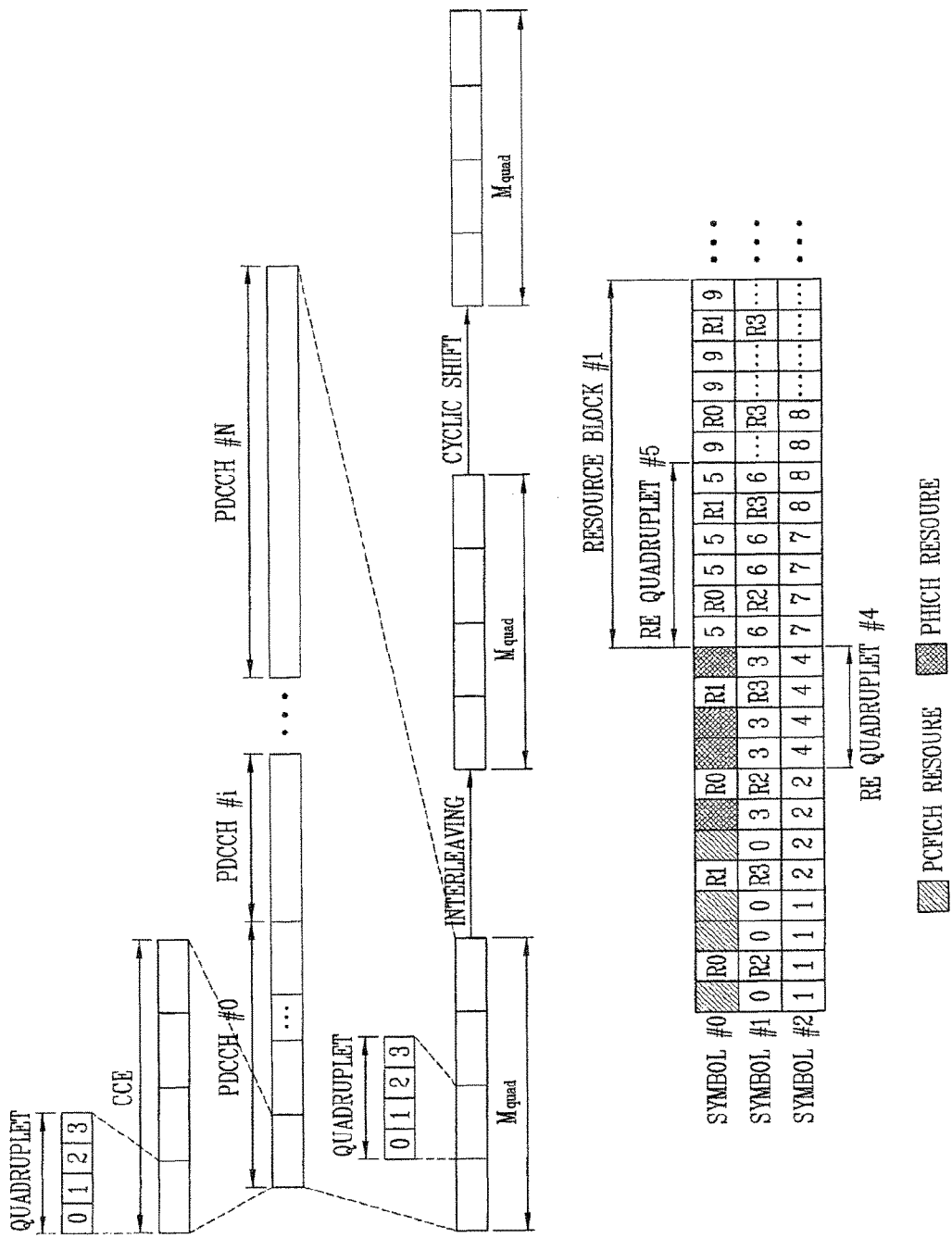
FIG. 6 illustrates an example of resource mapping of a PDCCH.

FIG. 6 illustrates an example of the resource mapping of the PDCCH.

Referring to FIG. 6, R0 is a standard signal of a first antenna, R1 is a standard signal of a second antenna, R2 is a standard signal of a third antenna, and R3 is a standard signal of a fourth antenna.

The control region within the subframe includes a plurality of control channel elements (CCE). The CCE is a logical allocation unit used to provide the PDCCH with the coding rate, and corresponds to a plurality of resource element groups (REG). The REG includes a plurality of resource elements. The PDCCH format and the possible number of bits of the PDCCH are determined according to the correlation between the number of CCEs and the coding rate provided by the CCEs.

One REG (indicated as a quadruplet in the drawings) includes four REs, and one CCE includes 9 REGs. In order to constitute one PDCCH, {1, 2, 4, 8} CCEs may be used, and each element of {1, 2, 4, 8} is called a CCE aggregation level.

The control channel, which comprises one or more CCEs, performs interleaving in REG units, and is mapped to the physical resources after a cyclic shift based on the cell identifier is performed.

Figure 7:
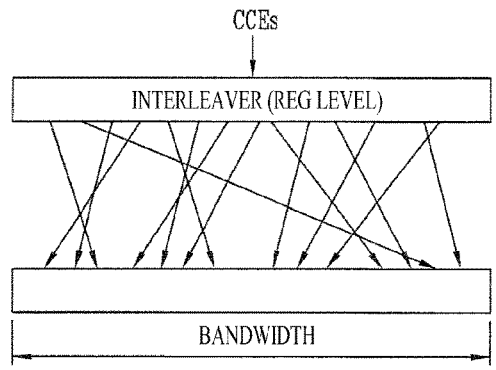
FIG. 7 illustrates CCE interleaving in a system band.

FIG. 7 illustrates an example of dispersing CCEs in a system band.

Referring to FIG. 7, a plurality of logically consecutive CCEs is input to an interleaver. The interleaver performs a function of mixing the plurality of input CCEs in REG units. Hence, the frequency/time resources, which form one CCE, are physically scattered in the entire frequency/time domain within the control region of the subframe. As such, the control channel is configured in CCE units, but interleaving is performed in REG units, and thus frequency diversity and interference randomization gain may be maximized.

Figure 8:
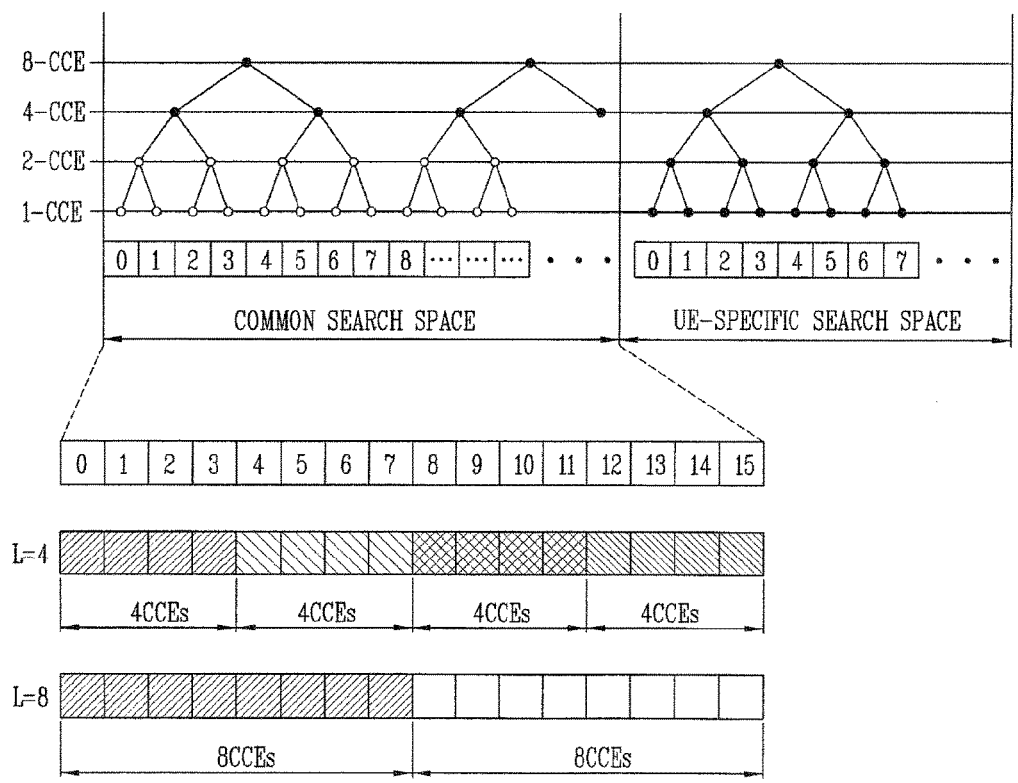
FIG. 8 illustrates a monitoring of a PDCCH.

FIG. 8 illustrates monitoring of a PDCCH.

In 3GPP LTE, blind decoding is used for detection of a PDCCH. The blind decoding is a scheme of checking the CRC error and determining whether the PDCCH is its own control channel by de-masking a desired identifier to the CRC of the received PDCCH (referred to as a PDCCH candidate). The UE does not recognize at which position within the control region its own PDCCH is transmitted using which CCE set level or DCI format.

A plurality of PDCCHs may be transmitted within one subframe. A UE monitors a plurality of PDCCHs for each subframe. Here, the monitoring attempts decoding of the PDCCH according to the monitored PDCCH format.

In 3GPP LTE, in order to reduce a burden due to blind decoding, a search space is used. The search space is a monitoring set of a CCE for the PDCCH. The UE monitors the PDCCH within a corresponding search space.

The search space is divided into a common search space and a UE-specific search space. The common search space, as a space for searching for a PDCCH having common control information, comprises 16 CCEs of indexes 0 to 15, and supports a PDCCH having {4, 8} CCE set level. However, a PDCCH (DCI format 0, 1), which carries UE-specific information, may be transmitted in the common search space. The UE-specific search space supports a PDCCH having a CCE set level of {1, 2, 4, 8}.

Table 4 below shows the number of PDCCH candidates monitored by the UE.

TABLE 4

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, |
|  | 8 | 16 | 2 | 3/3A |

The size of the search space is determined by the above Table 4, and in the start point of the search space, the common search space and the UE-specific search space are differently defined. The start point of the common search space is fixed regardless of the subframe, but the start point of the UE-specific search space may be changed per subframe according to the UE identifier (e.g., C-RNTI), the CCE set level and/or the slot number within the radio frame. In case the start point of the UE-specific search space is located in the common search space, the UE-specific search space may be overlapped with the common search space.

In the set level LE {1, 2, 3, 4}, the search space S(L) k is defined as a set of PDCCH candidates. The CCE corresponding to the PDCCH candidate m of the search space S(L) k is given as follows.

$$L \cdot \{(Y_k + m) \bmod \lfloor N_{CCE,k}/L \rfloor\} + i \quad \text{Formula 1}$$

Here, i=0, 1, . . . , L−1, m=0, . . . , M$^{(L)}$−1, and N$_{CCE,k}$ is the total number of CCEs which can be used in transmission of the PDCCH within the control region of subframe k. The control region includes a set of CCEs numbered 0 to N$_{CCE,k}$−1. M$^{(L)}$ is the number of PDCCH candidates in the CCE set level L in the given search space. In the common search space, Yk is two set levels, and is set to 0 for L=4 and L=8. In the UE-specific search space of set level L, variable Yk may be defined as follows.

$$Y_k = (A \cdot Y_{k-1}) \bmod D \quad \text{Formula 2}$$

Here, Y−1=n$_{RNTI}$≠0, A=39827, D=65537, k=floor(n$_s$/2), and ns is a slot number within the radio frame.

When the UE monitors the PDCCH using the PDCCH, the DCI format and search space, which should be monitored according to the transmission mode of the PDSCH, are determined.

Table 5 below shows an example of PDCCH monitoring where C-RNTI is set.

TABLE 5

| Transmission mode | DCI format | Search space | Transmission mode of PDSCH according to PDCCH |
|---|---|---|---|
| Mode 1 | DCI format 1A | Common and UE specific | Single antenna port, port 0 |
|  | DCI format 1 | UE specific | Single antenna port, port 0 |
| Mode 2 | DCI format 1A | Common and UE specific | transmit diversity |
|  | DCI format 1 | UE specific | transmit diversity |
| Mode 3 | DCI format 1A | Common and UE specific | transmit diversity |
|  | DCI format 2A | UE specific | cyclic delay diversity (CDD or transmit diversity |
| Mode 4 | DCI format 1A | Common and UE specific | transmit diversity |
|  | DCI format 2 | UE specific | closed-loop spatial multiplexing |
| Mode 5 | DCI format 1A | Common and UE specific | transmit diversity |
|  | DCI format 1D | UE specific | closed-loop spatial multiplexing |
| Mode 6 | DCI format 1A | Common and UE specific | transmit diversity |
|  | DCI format 1B | UE specific | closed-loop spatial multiplexing |
| Mode 7 | DCI format 1A | Common and UE specific | if the number of PBCH transmit ports is 1, single antenna port, port 0, otherwise, transmit diversity |
|  | DCI format 1 | UE specific | single antenna port, port 5 |
| Mode 8 | DCI format 1A | Common and UE specific | if the number of PBCH transmit ports is 1, single antenna port, port 0, otherwise, transmit diversity |
|  | DCI format 2B | UE specific | dual layer transmit (port 7 or 8), or single antenna port, port 7 or port 8 |

When the UE monitors the PDCCH using SPS C-RNTI, the search space and DCI format to be monitored are determined according to the transmission mode of the PDSCH.

Table 6 below shows an example of PDCCH monitoring in which the SPS C-RNTI is set.

TABLE 6

PDCCH and PDSCH configured by SPS C-RNTI

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Transmit diversity (see subclause 7.1.2) |

TABLE 6-continued

PDCCH and PDSCH configured by SPS C-RNTI

| Transmission mode | DCI format | Search Space | Transmission scheme of PDSCH corresponding to PDCCH |
|---|---|---|---|
| Mode 5 | DCI format 1A | Common and UE specific by C-RNTI | Transmit diversity (see subclause 7.1.2) |
| Mode 6 | DCI format 1A | Common and UE specific by C-RNTI | Transmit diversity (see subclause 7.1.2) |
| Mode 7 | DCI format 1A | Common and UE specific by C-RNTI | Single-antenna port; port 5 |
|  | DCI format 1 | UE specific by C-RNTI | Single-antenna port; port 5 |

Table 7 below shows an example of PDCCH monitoring where the SPS C-RNTI is set.

TABLE 7

PDCCH configured by SPS C-RNTI

| DCI format | Search Space |
|---|---|
| DCI format 0 | Common and UE specific by C-RNTI |

Hereinafter, a multiple carrier system will be described.

A 3GPP LTE system supports a case where the downlink band and the uplink band are differently set, but this is based on one component carrier (CC).

This means that, in a situation in which one CC is defined for downlink and uplink, 3GPP LTE is supported only when the bandwidth of the downlink and the bandwidth of the uplink are the same or are different from each other. For example, 3GPP LTE supports a maximum bandwidth of 20 MHz, and the uplink bandwidth and the downlink bandwidth may be different, but only one CC is supported for uplink and downlink.

The spectrum aggregation (or referred to as bandwidth aggregation or carrier aggregation) is to support a plurality of CCs. Spectrum aggregation is introduced to support throughput, prevent cost increase due to introduction of a broadband radio frequency (RF) device, and secure compatibility with an existing system. For example, if 5 CCs are allocated as the granularity of the carrier unit having a bandwidth of 20 MHz, the maximum bandwidth of 100 MHz may be supported.

Spectrum aggregation may be divided into contiguous spectrum aggregation made between continuous carriers and non-contiguous spectrum aggregation made between non-continuous carriers in a frequency domain. The number of CCs aggregated between downlink and uplink may be differently set. When the number of the uplink CCs and the number of the downlink CCs are the same, the aggregation is called symmetric aggregation, and when the numbers are different, the aggregation is called asymmetric aggregation.

Further, the component carrier may be called "cell".

Specifically, the "cell" may mean a pair of a downlink component carrier and an uplink component carrier. Here, the uplink component carrier refers to a component carrier which has been linked with the downlink component carrier.

Further, the "cell" may also mean only a downlink component carrier.

That is, the "cell" may be used as a concept of a pair of a DL CC and a UL CC or as a term meaning only a DL CC.

Here, the "cell" should be distinguished from a "cell" as a generally used area covered by a base station.

Hereinafter, the "cell" and the component carrier are used together and may be understood as the same concept.

The sizes of the CCs (i.e., bandwidth) may be different. For example, when 5 CCs are used to constitute a 70 MHz band, a possible configuration is 5 MHz carrier (CC #0)+20 MHz carrier (CC #1)+20 MHz carrier (CC #2)+20 MHz carrier (CC #3)+5 MHz carrier (CC #4).

The configuration of a physical layer (PHY) and layer 2 (MAC) for transmission on a plurality of uplink or downlink carrier bands, which have been allocated from the perspective of an arbitrary cell or UE, is shown in FIGS. 9 and 10.

Figure 9A:
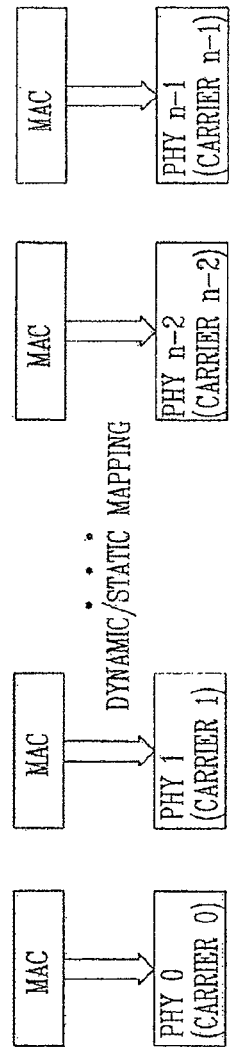
FIG. 9(a) illustrates a concept that a plurality of MACs manage a multi-carrier.
Figure 9B:
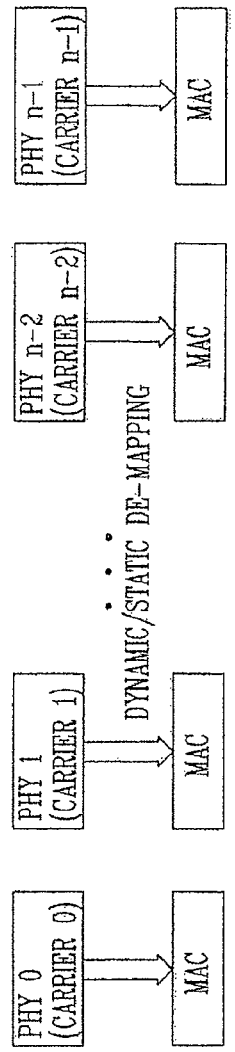
FIG. 9(b) illustrates a concept that a plurality of MACs manage a multi-carrier.

FIG. 9(a) illustrates a concept of managing a multi-carrier by a plurality of MACs in a base station, and FIG. 9(b) illustrates a concept of managing a multi-carrier by a plurality of MACs in a UE.

As shown in FIGS. 9(a) and 9(b), each MAC may control each carrier by 1:1. In a system which supports a plurality of carriers, each carrier may be used in a contiguous or non-contiguous manner. This may be applied regardless of the distinction between uplink and downlink. The TDD system may be configured to operate N carriers including transmission of the downlink and the uplink in each carrier, and the FDD system is constituted to use a multiple of carriers in uplink and downlink, respectively. In the case of the FDD system, the number of carriers aggregated in uplink and downlink and/or carrier aggregation of asymmetric carriers with different bandwidths may be supported.

Figure 10A:
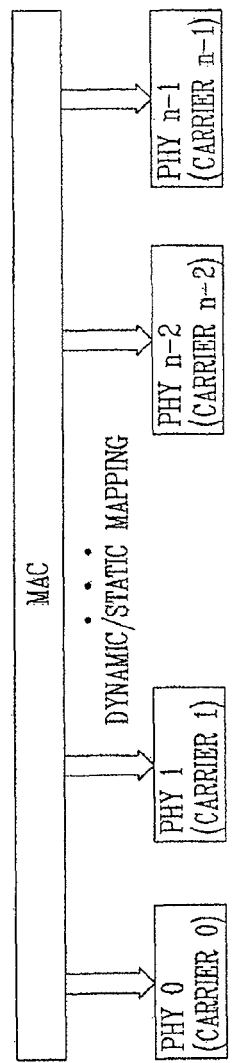
FIG. 10(a) illustrates a concept that one MAC manages a multi-carrier in a base station.
Figure 10B:
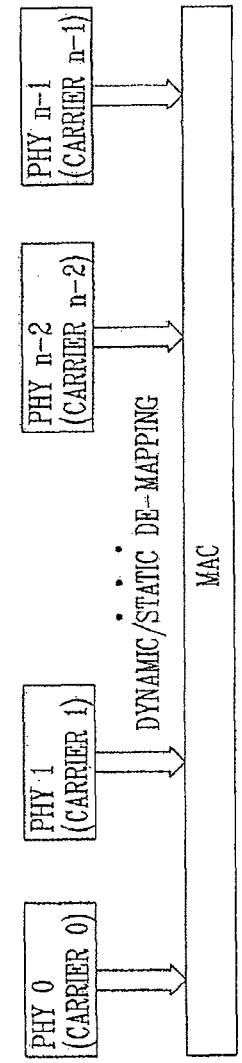
FIG. 10(b) illustrates a concept that one MAC manages a multi-carrier in a user equipment.

FIG. 10(a) illustrates a concept of managing a multi-carrier by one MAC by a base station, and FIG. 10(b) illustrates a concept of managing a multi-carrier by one MAC in a UE.

Referring to FIGS. 10(a) and 10(b), one MAC performs transmission and reception by managing and operating one or more frequency carriers. Since frequency carriers managed in one MAC do not need to be contiguous to each other, resource management is more flexible which is advantageous. In FIGS. 10(a) and 10(b), one PHY is set to mean one component carrier for convenience of explanation. Here, one PHY does not necessarily mean an independent radio frequency (RF) device. Generally, one independent RF device means one PHY, but is not necessarily limited thereto, and one RF may include several PHYs.

Further, a series of downlink control channels (PDCCH), which transmit control information of L1/L2 control signaling generated from the packet scheduler of the MAC layer to support the configuration in FIGS. 10(a) and 10(b), may be mapped to the physical resource within the individual component carrier, and then transmitted.

At this time, particularly, the PDCCH about the control information, which is related with the grant or channel allocation related with the PUSCH or the individual unique PDSCH, may be generated as an encoded and distinguished PDCCH by being distinguished by component carriers in which the physical shared channel is transmitted. This is called a separate coded PDCCH. As another method, control information for physical shared channel transmission of several component carriers may be configured and transmitted as one PDCCH, and this is called a joint coded PDCCH.

In order to perform downlink or uplink carrier aggregation, a connection may be set so that the PDCCH and/or PDSCH for performing transmission of control information and data may be performed according to the situation in a unique manner for a specific UE or each relay, or the base station may allocate component carriers which are the object of measurement and/or reporting as a process of preparing for performing a connection setting for transmission of the PDCCH and/or PDSCH. This is expressed as component carrier allocation according to an arbitrary purpose.

At this time, in case the carrier allocation information is controlled in the L3 radio resource management (RRM), the base station may transmit the information by a series of unique UE or relay RRC signaling (UE-specific or relay-specific RRC signaling) according to dynamic features of the control, or may transmit the information through a series of PDCCHs or a series of dedicated physical control channels for transmission only of control information by L1/L2 control signaling.

Figure 11:
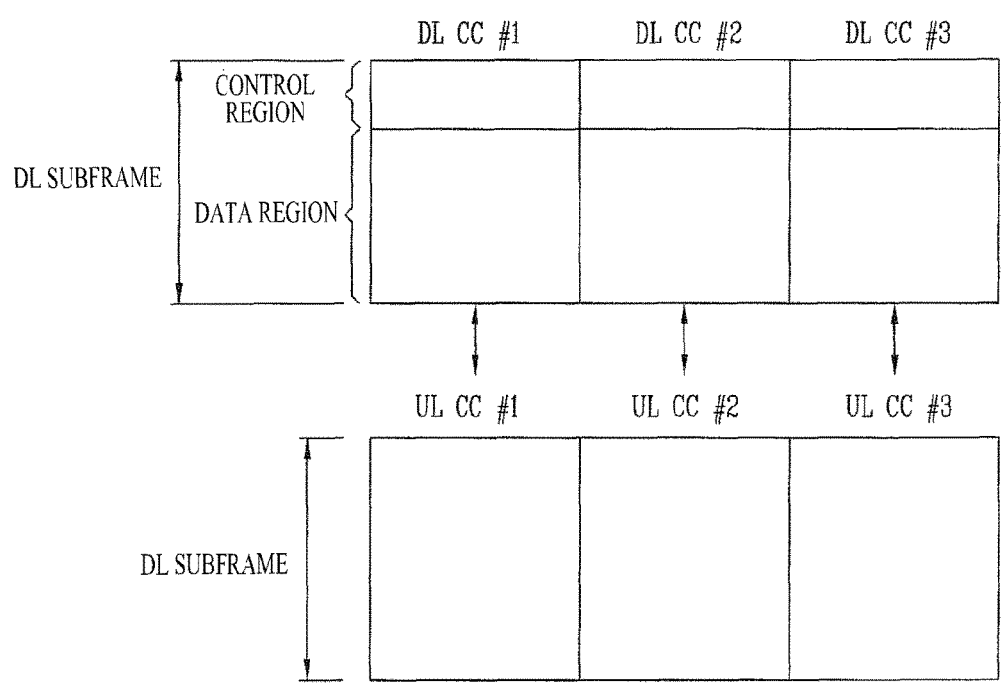
FIG. 11 illustrates an example of a multiple carrier.

FIG. 11 illustrates an example of a multi-carrier.

There are three DL CCs and three UL CCs, but the numbers of the DL CCs and UL CCs are not limited thereto. In each DL CC, the PDCCH and the PDSCH are independently transmitted, and in each UL CC, the PUCCH and the PUSCH are independently transmitted.

Hereinafter, a multiple carrier system refers to a system which supports a multiple carrier based on spectrum aggregation as described above.

In the multiple carrier system, contiguous spectrum and/or non-contiguous spectrum aggregation may be used, or symmetric aggregation or non-symmetric aggregation may also be used.

In the multiple carrier system, a linkage between a DL CC and a UL CC may be defined. The linkage may be constituted through EARFCN information included in the downlink system information, and is constituted using the fixed DL/UL Tx/Rx separation relation. The linkage refers to a mapping relation between a DL CC where the PDCCH carrying the UL grant is transmitted and a UL CC using the UL grant.

Further, the linkage may be a mapping relation between a DL CC (or a UL CC) where data for HARQ is transmitted, and a UL CC (or a DL CC) where the HARQ ACK/NACK signal is transmitted. The base station may notify the UE of the linkage information as part of system information or the upper level message such as an RRC message. The linkage between the DL CC and the UL CC may be fixed, but may also be changed between cells and between UEs.

A separate coded PDCCH means that the PDCCH is capable of carrying control information such as resource allocation for the PDSCH/PUSCH on one carrier. That is, the PDCCH & the PDSCH and the PDCCH & PUSCH respectively correspond to each other 1:1.

A joint coded PDCCH means that the PDCCH is capable of carrying resource allocation for the PDSCH/PUSCH of a plurality of CCs. One PDCCH may be transmitted through one CC, or may be transmitted through a plurality of CCs.

Hereinafter, an example of separate coding based on the PDSCH-PDSCH, which is a downlink channel, is illustrated, but this may also be applied to the PDCCH-PUSCH relation.

In the multiple carrier system, two methods of cc scheduling are possible.

A first method is transmitting a PDCCH-PDSCH pair in one CC. This CC is called a self-scheduling CC. Further, this means that the UL CC where the PUSCH is transmitted means that it becomes a CC linked to the DL CC where the PDCCH is transmitted.

That is, in the case of the PDCCH the PDSCH resource is allocated in the same CC, or the PUSCH resource is allocated in the linked UL CC.

A second method is that a DL CC, where the PDSCH is transmitted, and a UL CC, where the PUSCH is transmitted, are determined regardless of the DL CC where the PDCCH is transmitted. That is, the PDCCH and the PDSCH are transmitted at different DL CCs, or the PUSCH is transmitted through the DL CC where the PDCCH is transmitted or the non-linked UL CC. This is called cross-carrier scheduling.

The CC where the PDCCH is transmitted is called PDCCH carrier, monitoring carrier or scheduling carrier, and the CC where the PDSCH/PUSCH is transmitted may be called the PDSCH/PUSCH carrier or scheduled carrier.

The cross-carrier scheduling may be activated or deactivated, the UE, where cross-carrier scheduling is activated, may receive a DCI including a CIF. The UE may recognize which scheduled CC the PDCCH received from the CIF included in the DCI is control information about.

The DL-UL linkage predefined by the cross-carrier scheduling may be overriding. That is, cross-carrier scheduling may schedule a CC other than the linked CC regardless of the UL-UL linkage.

Figure 12:
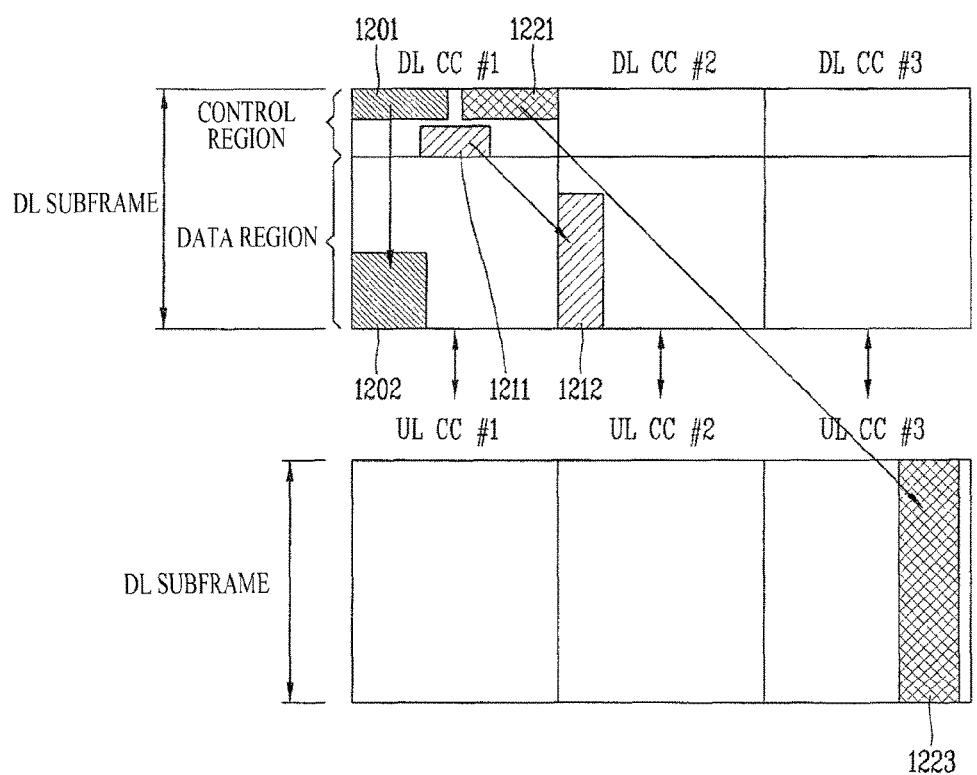
FIG. 12 illustrates an example of cross-carrier scheduling.

FIG. 12 illustrates an example of the cross-carrier scheduling.

It is assumed that the DL CC #1 is linked with UL CC #1, DL CC #2 is linked with UL CC #2, and DL CC #3 is linked with UL CC #3.

A first PDCCH 1201 of DL CC #1 carries the DCI for the PDSCH 1202 of the same DL CC #1. A second PDCCH 1211 of the DL CC #1 carries the DCI for the PDSCH 1212 of the DL CC #2. A third PDCCH 1221 of the DL CC #1 carries the DCI for the PUSCH 1222 of the non-linked UL CC #3.

The DCI of the PDCCH may include the carrier indicator field (CIF) for the cross-carrier scheduling. The CIF indicates the DL CC or UL CC scheduled through DCI. For example, the second PDCCH 1211 may include the CIF indicating the DL CC #2. The third PDCCH 1221 may include the CIF indicating the UL CC #3.

Further, the CIF of the third PDCCH 1221 may be notified not as a CIF value corresponding to the UL CC, but as the CIF value corresponding to the DL CC.

That is, the CIF of the third PDCCH 1221 may indirectly indicate the UL CC #3 where the PUSCH has been scheduled by indicating the DL CC #3 linked with the UL CC #3. This is because, if the DCI of the PDCCH includes PUSCH scheduling and the CIF indicates the DL CC, the UE can recognize the PUSCH scheduling on the UL CC linked with the DL CC. As such, it is possible to indicate a larger number of CCs than the method of giving information on all DL/UL CCs using the CIF having a limited bit length (e.g., a 3 bit CIF).

A UE, which uses cross-carrier scheduling, needs to monitor the PDCCH of a plurality of scheduled CCs for the same DCI format within the control region of one scheduling CC. For example, if the transmission modes of a plurality of DL CCs are different, it is possible to monitor a plurality of PDCCHs for different DCI formats for each DL CC.

Even if the same transmission mode is used, if the bandwidths of DL CCs are different, the size of the payload of the DCI format is different under the same DCI format, and thus a plurality of PDCCHs may be monitored.

Consequently, when the cross-carrier scheduling is possible, the UE needs to monitor the PDCCH for a plurality of DCIs in the control region of the monitoring CC according to the transmission mode and/or bandwidth for each CC. Hence, there is a need for constitution of a search space supporting the same, and monitoring of the PDCCH.

First, in a multiple carrier system, the following terms are defined.

UE DL CC set: A set of DL CCs scheduled so that the UE may receive the PDSCH.

UE UL CC set: A set of UL CCs scheduled so that the UE may receive the PUSCH.

PDCCH monitoring set: At least one set of DL CCs performing PDCCH monitoring. The PDCCH monitoring set may be the same as the UE DL CC set, or a subset of the UE DL CC set. The PDCCH monitoring set may include at least one of the DL CCs within the UE DL CC set. Further, the PDCCH monitoring set may be individually defined regardless of the UL DL CC set. The DL CC, which is included in the PDCCH monitoring set, may be set so that self-scheduling for the linked UL CC is always possible.

The UE DL CC set, the UE UL CC set and the PDCCH monitoring set may be set to be cell specific or UE specific.

Further, the following shows which DCI format the CIF may belong to.

If a CRC is scrambled as P-RNTI, RA-RNTI or TC-RNTI, the DCI format does not include the CIF.

DCI formats 0, 1, 1A, 1B, 1D, 2, 2A and 2B, which can be received in the UE specific search space, may include the CIF if the CRC is scrambled (or masked) by the C-RNTI and SPS-RNTI.

Figure 13:
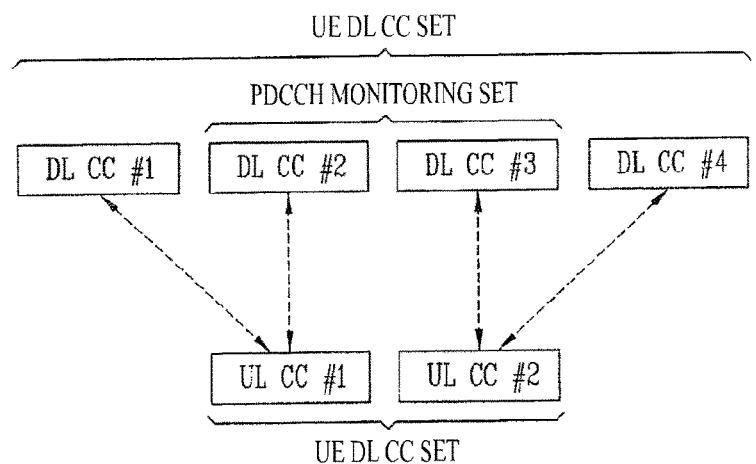
FIG. 13 illustrates an example of a component carrier (CC) set.

FIG. 13 shows an example of a CC set. Here, we assumed that four DL CCs (DL CC #1, #2, #3, #4) as a UE DL CC set, two UL CCs (UL CC #1, #2) as a UE UL CC set, and two DL CCs (DL CC #2, #3) as a PDCCH monitoring set, have been allocated to the UE.

DL CC #2 within the PDCCH monitoring set transmits the PDCCH for the PDSCH of the DL CC #1/#2 within the UE DL CC set and the PDCCH for the PUSCH of the UL CC #1 within the UE UL CC set. The DL CC #3 within the PDCCH monitoring set transmits the PDCCH for the PDSCH of the DL CC #3/#4 within the UE DL CC set and the PDCCH for the PUSCH of the UL CC #2 within the UE UL CC set.

A linkage may be set between CCs included in the UE DL CC set, UE UL CC set and PDCCH monitoring set. In the example of FIG. 13, a PDCCH-PDSCH linkage is set between the DL CC #2, which is a scheduling CC, and the DL CC #1, which is a scheduled CC. Further, the PDCCH-PUSCH linkage is set to the DL CC #2 and the UL CC #1. Further, a PDCCH-PDSCH linkage is set between the DL CC #3, which is a scheduling CC, and the DL CC #4, which is a scheduled CC. Further, a PDCCH-PUSCH linkage is set to the DL CC #3 and the UL CC #2. The base station may inform the UE of information about such scheduling CC or the PDCCH-PDSCH/PUSCH linkage information through cell specific signaling or UE specific signaling.

Further, for each of the DL CCs within the PDCCH monitoring set, the DL CC and the UL CC may not be linked. After linking the DL CC within the PDCCH monitoring set with the DL CC within the UE DL CC set, the UL CC for the PUSCH transmission may be limited to the UL CC linked to the DL CC within the UE DL CC set.

The CIF may be differently set according to the linkage of the UE DL CC set, UE UL CC set and PDCCH monitoring set.

Hereinafter, the ambiguity of the DCI detection in the cross-carrier scheduling and methods for solving the ambiguity problem will be described.

First, the ambiguity of DCI detection in cross-carrier scheduling will be described.

In the carrier aggregation system, in case the cross-carrier scheduling is not activated, the PDCCH monitoring CC set is always considered the same as a UE specific DL CC set. In this case, separate signaling for the PDCCH monitoring CC set does not need to be instructed. In contrast, in the case that cross carrier scheduling is activated, the PDCCH monitoring CC set needs to be defined within the UE specific DL CC set. Hence, in this case, a separate signal for the PDCCH monitoring CC set may be necessary.

Figure 14A:
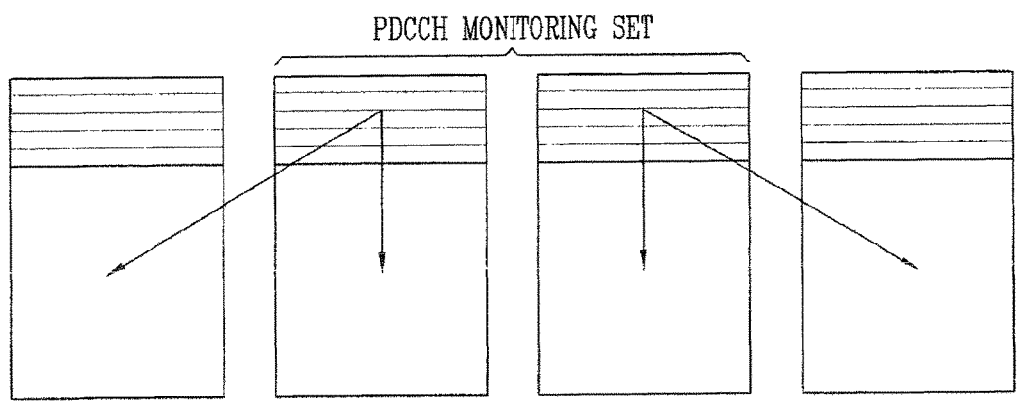
FIGS. 14A and 14B illustrate a method for linking a DL CC included in a PDCCH monitoring CC set with a CC which transmits a PDSCH/PUSCH.
Figure 14B:
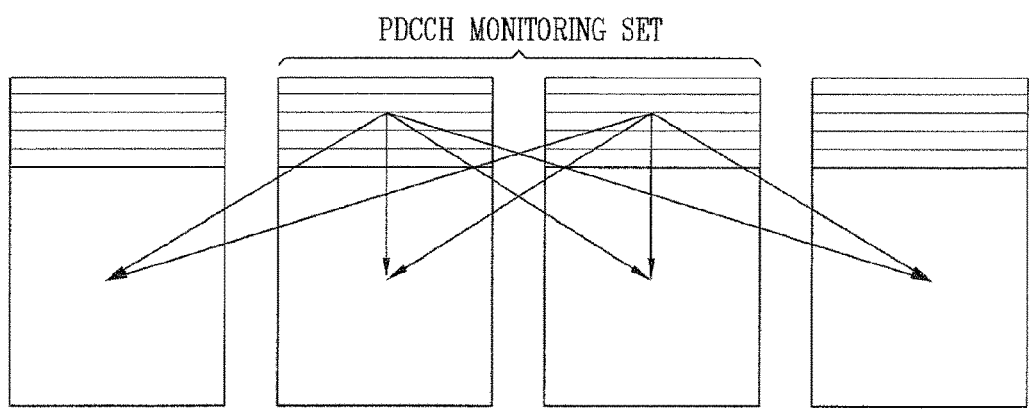

FIGS. 14(a) and 14(b) illustrate a method for linking a DL CC included in the PDCCH monitoring CC set with the CC transmitting the PDSCH/PUSCH. FIGS. 14(a) and 14(b) assume that all DL CCs form pairs with the UL CCs.

Option 1

Referring to FIG. 14A, according to option 1, each CC transmitting PDSCH/PUSCH (hereinafter, referred to as PDSCH/PUSCH CC) is scheduled through one DL CC. That is, only one DL CC needs to be monitored for the PDSCH/PUSCH CC. In the DL CC having the CIF, the UE monitors the PDCCH, and the PDCCH of the DL CC may schedule at least one of the PDSCH for the same DL CC and/or the PUSCH of the UL CC linked to the DL CC.

Option 2

Referring to FIG. 14B, according to option 2, the PDSCH/PUSCH CC may be scheduled through one or more DL CCs. The PDSCH/PUSCH CC may be scheduled through only one DL CC in each subframe, but may also be scheduled through different DL CCs in different subframes. In the DL CC having the CIF where the UE monitors PDCCH, the PDCCH may schedule at least one of the PDSCH of the same DL CC and/or the PUSCH of the linked UL CC. Option 2 does not increase the number of blind decodings and/or the CRC false detection rate compared to the system without the CIF.

If it is assumed that the UE attempts blind decoding 12 times in the common search space of each CC, in the case of the non cross-carrier scheduling, the maximum number of blind decoding attempts becomes 44. Further, in the case of cross carrier scheduling, the maximum number of blind decoding attempts may be calculated as follows.

$$\sum_{i=0}^{M-1} 44EN(i) \qquad \text{Formula 3}$$

In the above formula 3, M indicates the number of DL CCs of the PDCCH monitoring CC set. Each DL CC of the PDCCH monitoring CC set is numbered i=0, 1, . . . , (M−1), and N(i) represents the number of DL CCs which can be scheduled from the DL CC i.

For example, it is assumed that there are two DL CCs (hereinafter, referred to as the PDCCH monitoring DL CC) in the PDCCH monitoring CC set, and there are four CCs for transmitting the PDSCH/PUSCH (i.e., PDSCH/PUSCH CC). In this case, it is assumed that the size of the common search space of the PDCCH monitoring DL CC for the PDSCH/PUSCH CC is the same as the comparing difference carrier scheduling.

In the case of option 1, the UE repeats blind-decoding one PDCCH monitoring DL CC for two PDSCH/PUSCH CCs twice, and thus the maximum number of blind decoding attempts becomes 2×2×44=176. In contrast, in the case of option 2, the UE should blind-decode the two PDCCH monitoring DL CCs for four PDSCH/PUSCH CCs, and thus the maximum number of blind decoding attempts becomes 4×2×44=352. That is, in option 2, a much greater number of blind decoding attempts should be made.

When using option 1, in the case of the comparing difference carrier scheduling, the DL CC other than the PDCCH monitoring CC does not need to be monitored, Rel-8 blind decoding overhead is required for each DL CC. However, unlike option 2, there is a restriction in the scheduling, and thus it is difficult to support full flexible scheduling. When using option 2, the full flexible scheduling may be supported, but excessive blind decoding complexity may be generated on the side of the UE.

A method for using advantages of options 1 and 2 will be described below.

Option 3

The base station first sets the DL CC which transmits the PDCCH for the PDSCH/PUSCH CC. The DL CC having the CIF (where the UE monitors the PDCCH) may perform scheduling for at least one of the PDSCH of the same DL CC and/or the PUSCH of the linked UL CC. At this time, in case the PDCCH has the same DCI payload size among the PDSCH/PUSCH CC, the search space may be shared.

Figure 15A:
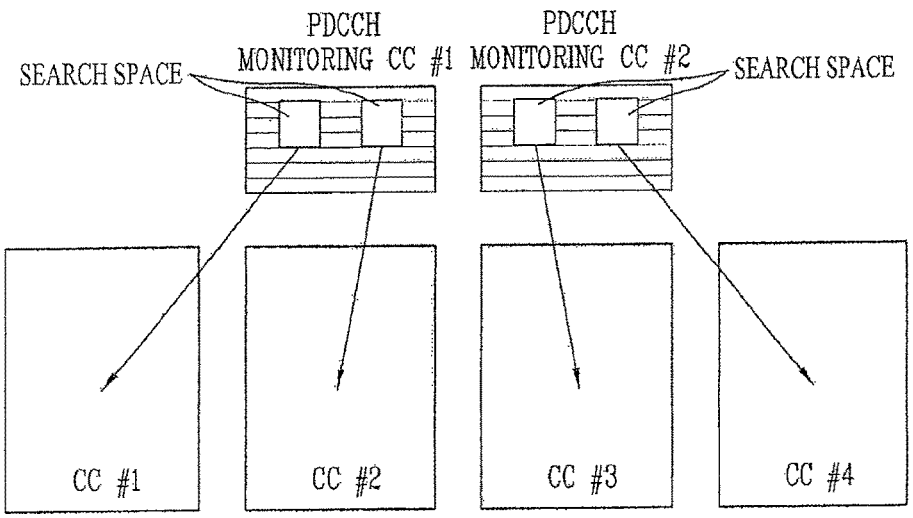
FIGS. 15(a) and 15(b) illustrate a method 3 (modified method 1) which will be described later.

FIGS. 15(a) and (b) illustrate the above described option 3 (amended option 1).

Figure 15B:
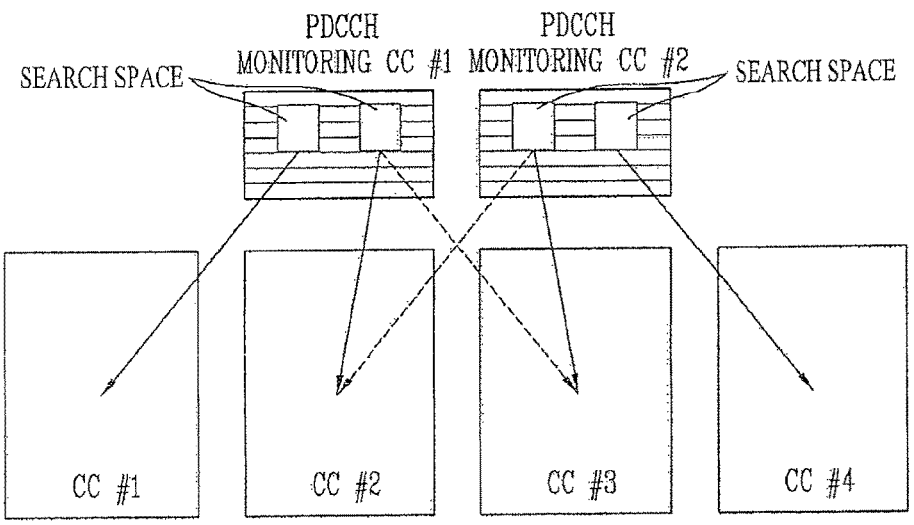

Referring to FIG. 15(a), the PDCCH monitoring DL CC #1 transmits the PDCCH for CC #1 and CC #2, and the PDCCH monitoring DL CC #2 transmits the PDCCH for CC #3 and CC #4. Here, in case the DCI payload size of the PDCCH for CC #2 is the same as the DCI payload size of the PDCCH for CC #3, the search space for CC #2 and CC #3 may be shared as in FIG. 15(b).

Hereinafter, the DL CC, where the UE monitors the PDCCH, is called the monitoring CC for convenience of explanation. Further, the DL CC, where the UE receives the PDSCH, is called the PDSCH CC, and the UL CC, where the UE transmits the PUSCH, is called the PUSCH CC. The PUSCH CC and the PUSCH CC are commonly called the scheduled CC.

For example, it is assumed that the scheduled CC #2 is linked to the monitoring CC #1, and the scheduled CC #3 is linked to the monitoring CC #2. In such case, the UE first monitors the monitoring CC #1 in order to receive the PDCCH of the scheduled CC #2, and first monitors the monitoring CC #2 in order to receive the PDCCH of the scheduled CC #3. However, in the PDCCH of the scheduled CC #2 and the PDCCH of the scheduled CC #3, if the DCI sizes are the same, the search space may be set to be shared. That is, in case the DCI sizes are the same, the UE may first monitor the PDCCH even in the DL CC other than the linked monitoring CC. For example, the UE may monitor the monitoring CC #2 as well as the monitoring CC #1 for the scheduled CC #2.

The above option shares the search space for the PDCCHs only in the case in which the PDCCH for the scheduled CC, which can be received in one or more monitoring CCs, has the same DCI payload size. Further, the (prior) link relation is maintained as in the above option 1 only in case the PDCCH for the scheduled CC, which can be received in one or more monitoring CCs, has different DCI payload sizes. Through such a method, scheduling flexibility of the base station may be improved while maintaining a certain level.

At cross carrier scheduling, DCIs for one or more scheduled CCs may be detected in the monitoring CC. For example, the DCIs for one or more scheduled CCs may be detected by the search space sharing in two or more monitoring CCs as in the above option 3, or DCIs for one or more scheduled CCs may be detected by the search space sharing in one monitoring CC. When sharing the search space between PDCCHs having the same DCI size, a plurality of DCIs having the same DCI size may be detected. In such case, the UE may recognize that the PDCCH belongs to the UE itself through the CRC checking included in the process of receiving the PDCCH, but it may be difficult to determine the scheduled CC which the DCI having succeeded in detection is a DCI about. This is called ambiguity. (Sure is!)

For example, in the monitoring CC, which uses cross carrier scheduling, the DCI including the CIF and the DCI without the CIF in the search space may have the same DCI payload size. At this time, ambiguity occurs because the UE cannot determine whether the detected PDCCH is information about the DCI including the CIF or information about the DCI without the CIF (in the case that cross carrier scheduling is used, if the CIFs are included in all DCIs in the monitoring CC, it is possible to determine which scheduled CC the DCI is information about through the CIF, and thus ambiguity does not occur).

Further, if different CIF lengths coexist, even in if the DCIs including CIFs of different lengths have the same payload size, the same problem may occur.

That is, the above problem may occur in the following cases.

CASE 1. The downlink control information (DCI) transmitted to the common search space (SS) without the CIF and the DCI transmitted to the UE specific SS with the CIF are transmitted with the same size, and the section of the transmitted common SS overlaps with the section of the UE specific SS.

CASE 2. The DCI for the self-scheduling CC without the CIF and the DCI for the cross-scheduling CC with the CIF have the same size and are transmitted, and the section of the UE specific SS for the self-scheduling CC overlaps with the section of the UE specific SS for the cross carrier scheduling (overlaps partially or entirely), or the UE specific SS for the self-scheduling CC is shared with the UE specific SS for cross-carrier scheduling.

That is, in case the DCI format including the CIF and the DCI format without the CIF have the same DCI size, and the DCIs are transmitted to the overlapping SS or shared SS, such a problem may occur.

FIG. 16 illustrates a case in which DCI ambiguity occurs.

It is assumed that the control information for CC #1 and CC #2, i.e., the DCI, is transmitted through CC #1.

Figure 16A:
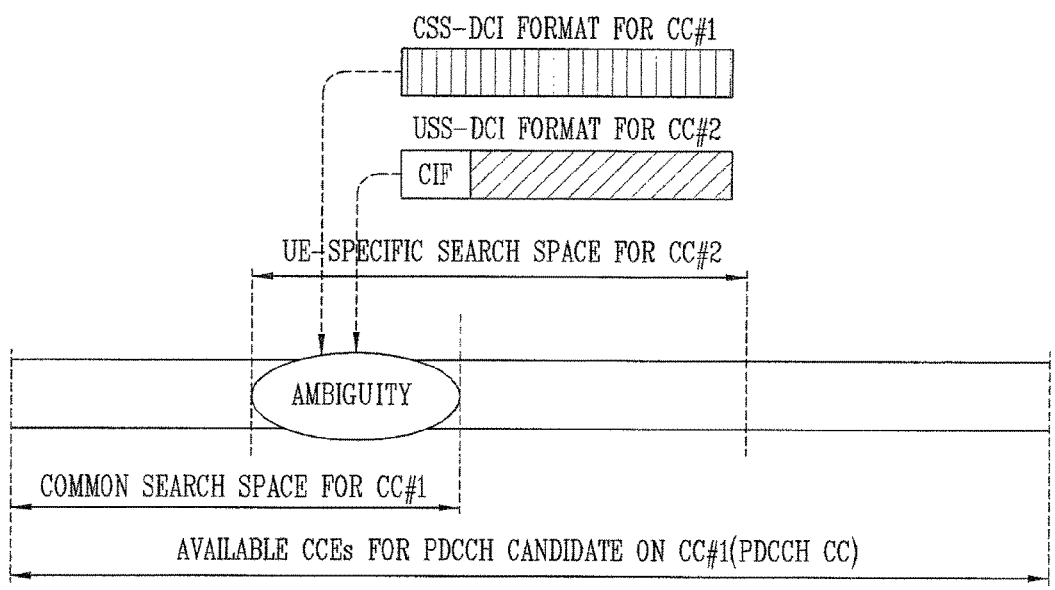
FIG. 16A illustrates an example in which ambiguity of DCI occurs in case a common search space (CSS) for CC #1 and a UE-specific search space (USS) for CC #2 overlap.

FIG. 16A illustrates an occurrence of ambiguity of the DCI when the common search space for CC #1 overlaps with the UE specific search space for CC #2.

As illustrated in FIG. 16A, in a section where the common search space for CC #1 overlaps with the UE specific search space for CC #2, if the DCI transmitted to the CSS without the CIF and the DCI transmitted to the USS with the CIF are transmitted with the same size, DCI ambiguity may occur.

Figure 16B:
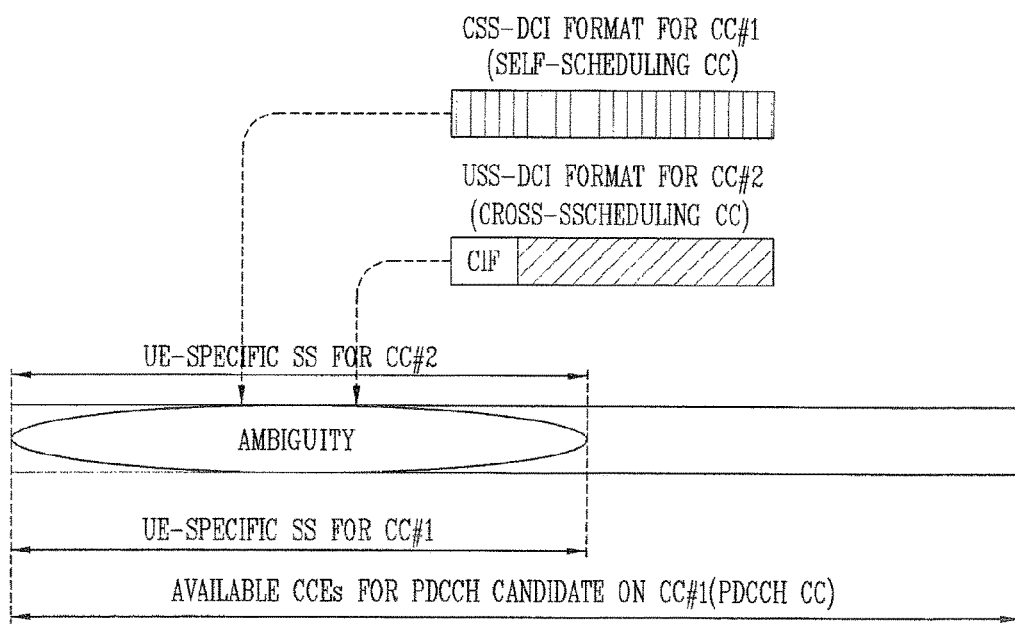
FIG. 16B illustrates an example where ambiguity of a DIC occurs in case a UE-specific search space for CC #1 and a UE-specific search space for CC #2 completely overlap.

FIG. 16B illustrates an example of occurrence of ambiguity of the DCI when the common search space for CC #1 completely overlaps with the UE specific search space for CC #2.

As illustrated in FIG. 16B, in a section where the common search space for CC #1 completely overlaps with the UE specific search space for CC #2, in case the DCI for the self-scheduling CC without the CIF and the DCI for the cross-scheduling CC with the CIF are transmitted with the same size, the DCI ambiguity may occur.

Figure 16C:
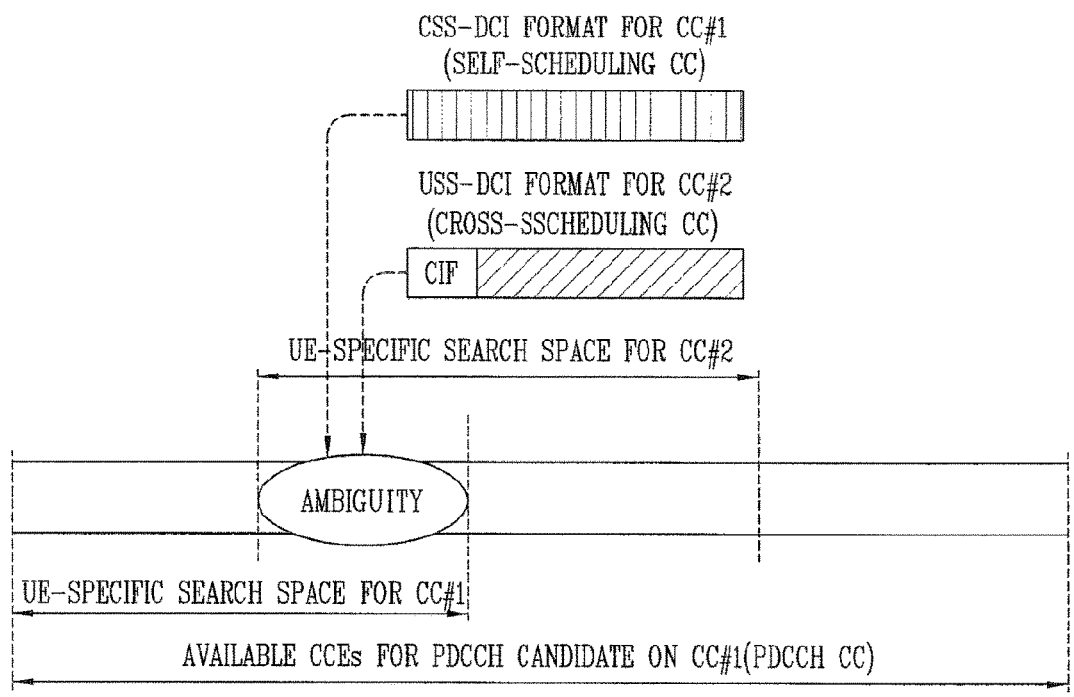
FIG. 16C illustrates an example in which ambiguity of a DCI occurs in case a UE-specific search space for CC #1 and a UE-specific search space for CC #2 partially overlap.

FIG. 16C illustrates an example of occurrence of ambiguity of a DCI in case the common search space for CC #1 partially overlaps with the UE specific search space for CC #2.

As illustrated in FIG. 16C, in a section where the common search space for CC #1 partially overlaps with the UE specific search space for CC #2, in case the DCI for the self-scheduling CC without the CIF and the DCI for the cross-scheduling CC with the CIF are transmitted with the same size, DCI ambiguity may occur.

Figure 16D:
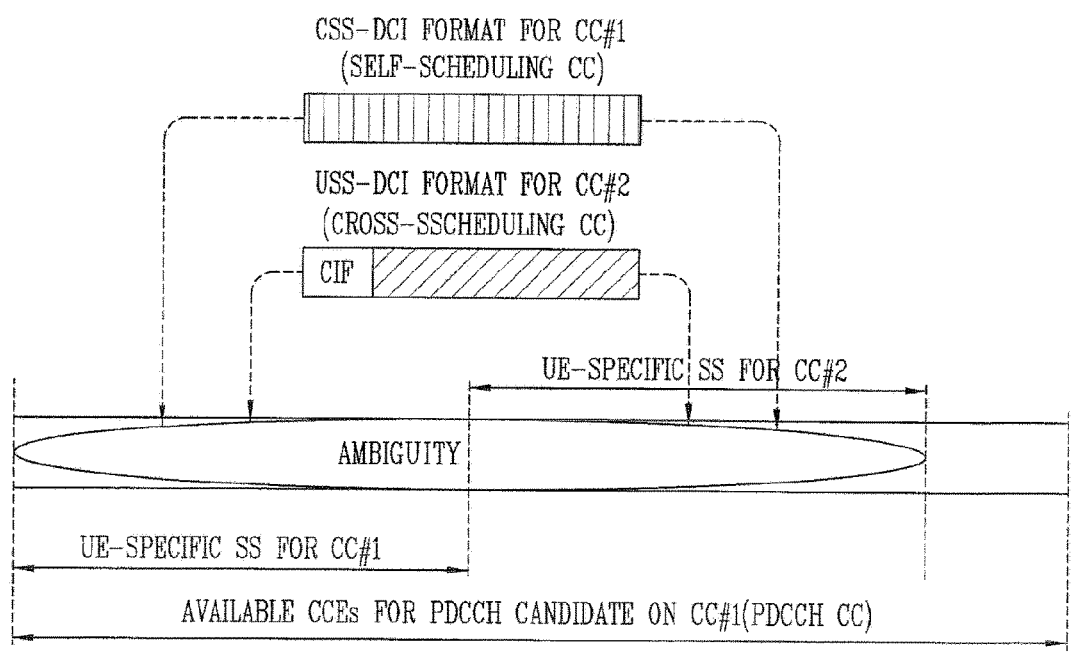
FIG. 16D illustrates an example in which ambiguity of a DCI occurs in case a UE-specific search space for CC #1 and a UE-specific search space for CC #2 are shared.

FIG. 16D illustrates an example of occurrence of ambiguity of a DCI in case the UE specific search space for CC #1 is shared with the UE specific search space for CC #2.

As illustrated in FIG. 16D, in a section where the common search space for CC #1 is shared with the UE specific search space for CC #2, in case the DCI for the self-scheduling CC without the CIF and the DCI for the cross-scheduling CC with the CIF are transmitted with the same size, the DCI ambiguity may occur.

That is, as shown in FIG. 16, the search space of the DCI for CC #1 may completely or partially overlap with the search space for the DCI for CC #2. The search space may be a common search space (CSS) or a UE specific search space (USS), or may be different for each CC. For example, the search space for CC #1 is the common search space, and the search space for CC #2 may be a UE-specific search space.

In case the search spaces overlap with each other, the DCI of Cc #1 or CC #2 may include the CIF or may not include the CIF. However, if the payload size of the DCI of CC #1 is the same as that of the DCI of CC #2, it is unclear whether the DCI detected in the overlapping search space includes the CIF.

As another problem, in case the search spaces for different CCs overlap with each other, the CIF values included in the DCI payload, which can be blind-decoded in the overlapping search space, may be the same. In such a case, ambiguity may occur about how the DCI information sets, which are located after the CIF, should be understood. Particularly, such a problem may occur when one DCI is for uplink and the other DCI is for downlink.

Hereinafter, in case PDCCH search spaces overlap in specific CCs suggested in the present invention, or the PDCCH search space is shared between specific CCs and the DCIs having the same size are transmitted in the overlapping or shared section, various methods for resolving ambiguity for the DCI detection considered above will be specifically described.

Method 1: Adding a Padding Bit

Method 1 is a method for resolving ambiguity of DCI detection in a section where the PDCCH search spaces overlap or are shared by adding the padding bits to one DCI among the DCIs having the same size.

That is, method 1 resolves the DCI size ambiguity by applying an additional padding bit to one of the DCIs where the DCI size ambiguity occurs.

As an example, in CASE 1 where the DCI ambiguity occurs, the padding bit may be set to be attached to the UE-specific DCI transmitted to the UE specific SS of the same size.

Further, in CASE 2 where the DCI ambiguity occurs, the padding bit may be set to be attached to the cross-carrier scheduling DCI or the self-scheduling DCI.

Method 2: Applying Additional Unique Identifier (RNTI)

Method 2 shows a method for resolving DCI detection ambiguity by performing additional RNTI masking to one of DCIs having the same size.

As an example, in the case of CASE 1 where the DCI ambiguity occurs, the additional RNTI may be set to be masked to the UE specific DCI transmitted in the UE specific SS of the same size.

Further, in the case of CASE 2 where the DCI ambiguity occurs, the additional RNTI may be set to be masked to the cross-carrier scheduling DCI or to be masked to the self-scheduling DCI.

Method 3: Constituting SS so that the CSS does not Overlap with the USS.

Method 3 is a method for resolving ambiguity for the DCI detection by making the DCI having the same size not be transmitted in the specific search space by constituting the CSS and the USS in a manner that they do not overlap with each other.

That is, Method 3 is a method for constituting the UE-specific SS, which will transmit the DCI of the UE specific SS having the same size as that of the DCI transmitted in the common SS, in a manner that is always disjointed with the common SS.

As an example for constituting the CSS and the USS in a disjointed manner, search space shifting may be used. In case the USS overlaps with the common SS as a result of constituting by calculating the start point, etc. (e.g., using a hash function), the search section of the USS is set to be shifted by as much as a portion where the USS section does not overlap with the CSS. Such a method may be applied in CASE 1 where DCI ambiguity occurs.

Figure 17:
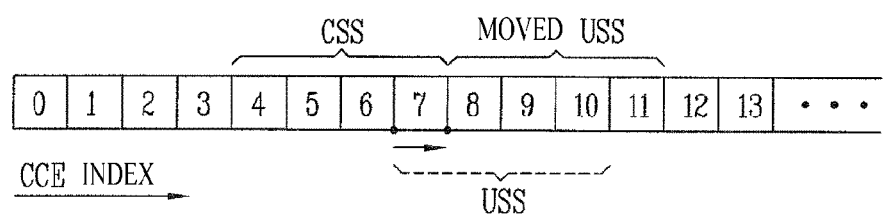
FIG. 17 illustrates a shifting of an overlapping section to prevent overlap between a CSS and a USS when the CSS is overlapped with the USS according to an embodiment of the present invention.

FIG. 17 shows that, in case the CSS overlaps with the USS, the shifting is made by as much as the overlapping section so that the CSS does not overlap with the USS according to an exemplary embodiment of the present invention.

Referring to FIG. 17, the CCE level of the CSS is 4, the CCE level of the USS is 4, and the CSS overlaps with the USS at CCE index 7. In this case, in order to prevent overlap between the CSS and the USS, the UE sets the start point of the USS to be shifted from CCE index 7 to CCE index 8 by 1.

FIG. 17 illustrates only shifting of the USS, but the UE can perform shifting of the CSS so that the CSS does not overlap with the USS.

Method 4: Constituting the Specific Search Space for Each CC in a Disjointed Manner.

Method 4 is a method of resolving ambiguity of DCI detection by constituting the search space of a specific CC in a manner that does not overlap with the search space of another CC.

The DCI size ambiguity problem is because PDCCHs having the same DCI size (DCI without CIF and DCI with CIF) are transmitted in a shared or overlapping search space. As a method for preventing such a problem, the CC specific SS of the specific CC is set to be always disjointed with the CC specific SS.

Here, the SS shifting, etc. as in the above method 3 may also be used in method 4. Further, even if the DCI sizes become the same, the DCI ambiguity may be resolved through modified method 1 or a method of not allowing the sharing of SS between different CCs such as SS sharing.

Method 4 may be applied to both CASES 1 and 2 where DCI ambiguity occurs.

Figure 18:
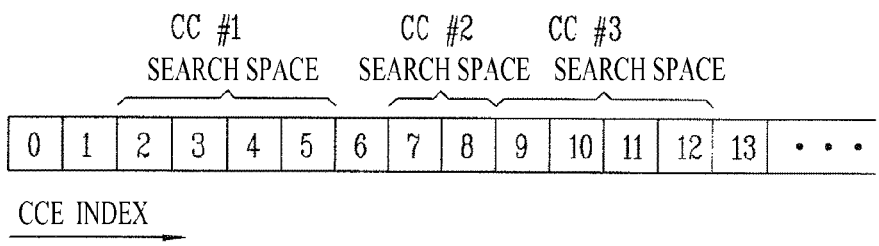
FIG. 18 illustrates a configuration of a search space to prevent overlap of the search spaces by CCs according to another embodiment of the present invention.

FIG. 18 illustrates a constitution of a search space so that the search spaces for each CC do not overlap with each other according to another exemplary embodiment of the present invention.

Referring to FIG. 18, the search space for CC #1 is comprised of up to CCE indexes 2 to 5, the search space for CC #2 is comprised of up to CCE indexes 7-8, and the search space for CC #3 is comprised of up to CCE indexes 9 to 12 so that the search spaces for each CC do not overlap.

Method 5: DCI Detection Considering Priorities (1)

Method 5 is a method of resolving DCI ambiguity by detecting DCIs giving priority to the UE specific DCI, the DCI for cross scheduling, and the DCI with the CIF transmitted to the UE specific search space in the overlapping or shared search space.

According to Method 5, the base station is not allowed to transmit the common DCI to the common SS in the overlapping or shared section in case the PDCCH search space overlaps or is shared. In this case, the UE determines that the DCI, which has been detected in the section where the CSS overlaps with the USS, is a DCI for the USS, and receives the shared channel, i.e., the PDSCH/PUSCH.

Further, method 5 is not to allow transmission of the DCI for the self-scheduling CC in the overlapping or shared PDCCH search space section. Hence, the UE determines that the DCI, which has been detected in a section where the search space for the self-scheduling CC overlaps or is shared with the search space for the cross-scheduling CC, is a DCI for the cross-scheduling CC, and thereafter receives the shared channel (PDSCH/PUSCH) and performs the feedback process.

That is, method 5 is to transmit DCIs with the CIF in the overlapping or shared PDCCH search space section. Hence, the UE gives priorities to DCIs with the CIF and decodes the DCI, which has been detected in the overlapping or shared SS section, based on the DCI with the CIF, and thereafter receives the shared channel and performs the feedback process.

Putting priority may mean performing blind decoding only for DCIs with the CIF, or first performing blind decoding for the DCIs with the CIF and thereafter performing blind decoding for DCIs without the CIF.

Method 6: DCI Detection Considering Priorities (2)

Method 6 provides a method for resolving the DCI ambiguity by detecting the DCI giving priority to the common DCI, the DCI for self-scheduling and DCI without the CIF transmitted to the common search space in the section where the PDCCH search spaces overlap or are shared. That is, method 6 is a method for detecting the DCI by putting priority in a manner opposite to that of method 5.

That is, according to method 6, the base station is not allowed to transmit the UE specific SS DCI to the overlapping and shared PDCCH search space section. Hence, the UE determines that the DCI, which has been detected in a section where the CSS overlaps with the USS, is a DCI for the CSS, and receives the shared channel.

Further, according to method 6, the base station is not allowed to transmit the DCI for the cross-scheduling CC to the overlapping or shared PDCCH SS section. Hence, the UE determines that the DCI, which has been detected in a section where the SS for the self-scheduling CC overlaps or is shared with the SS for cross-scheduling CC, is a DCI for the self-scheduling CC, and thereafter receives the shared channel and performs the feedback process.

That is, method 6 is to transmit DCIs without the CIF to the overlapping or shared PDCCH SS section. Hence, the UE gives priority to the DCI without the CIF, decodes the DCI, which has been detected in the overlapping or shared SS section, based on the DCI without the CIF, and thereafter receives the shared channel and performs the feedback process.

Here, giving priority may mean performing blind decoding only for DCIs without the CIF, or first performing blind decoding for DCIs without the CIF and thereafter performing blind decoding only for the DCIs with the CIF as described in the above method 5.

FIG. 19 illustrates a method of resolving DCI ambiguity in case the PDCCH search space overlaps or is shared by giving priority to the DCI without the CIF according another exemplary embodiment of the present invention.

Figure 19A:
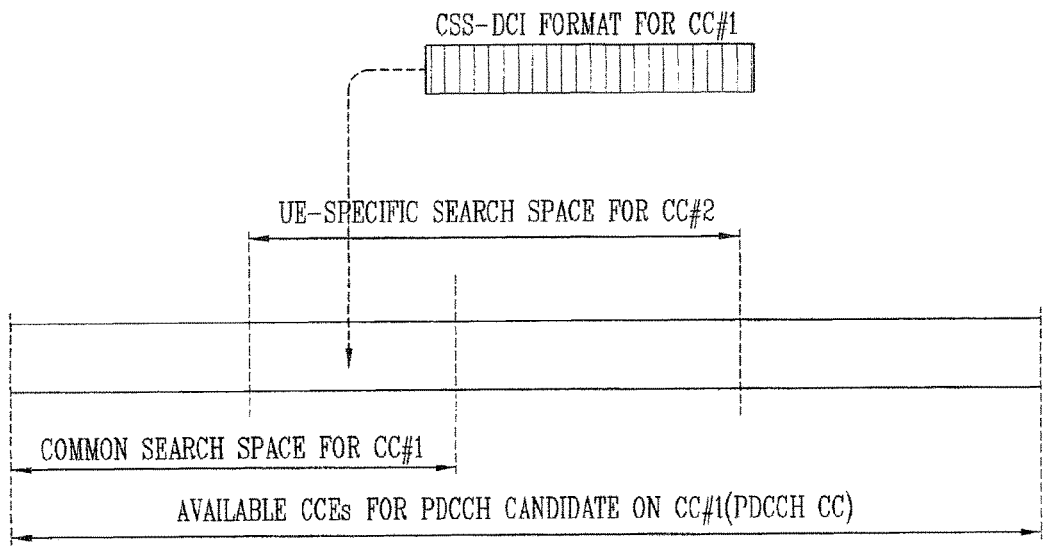
FIG. 19A illustrates a method for detecting a DCI corresponding to a CSS in an overlapping section in case the CSS overlaps with a USS

First, FIG. 19A illustrates a method of detecting a DCI corresponding to the CSS in an overlapping section when the CSS overlaps with the USS.

Referring to FIG. 19A, in the case of a section where the search spaces of the CSS and the USS overlap with each other, the UE determines that the DCI corresponding to the CSS is transmitted in the overlapping section, and performs blind decoding for a plurality of candidate PDCCHs. As a result of the blind decoding, the UE receives common downlink control information through the PDCCH corresponding to the CSS which has succeeded in decoding.

Figure 19B:
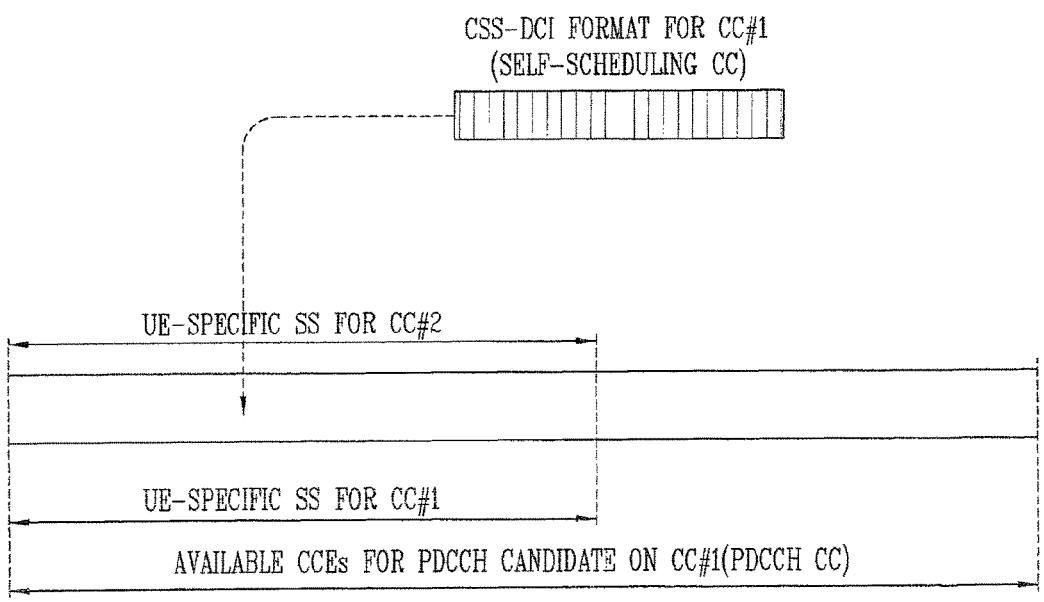
FIG. 19B illustrates a method for detecting a DCI for a self-scheduling CC in an overlapping section in case search spaces between USSs completely overlap with each other.

FIG. 19B illustrates a method of detecting a DCI for the self-scheduling CC in an overlapping section in case the search spaces between the USSs completely overlap with each other.

Referring to FIG. 19B, in case the search space of the USS for CC #1 completely overlaps with the search space of the USS for CC #2, the UE determines that the DCI corresponding to self-scheduling is transmitted in the overlapping section, and performs blind decoding for a plurality of candidate PDCCHs. As a result of the blind decoding, the UE receives downlink control information through the PDCCH corresponding to the self-scheduling which has succeeded in decoding.

Figure 19C:
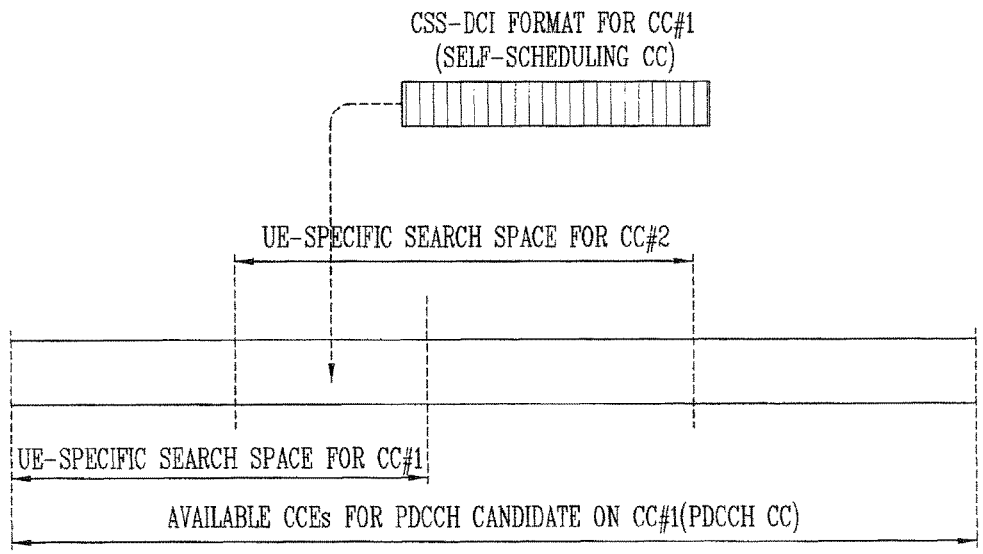
FIG. 19C illustrates a method for detecting a DCI for a self-scheduling CC in an overlapping section in case the search spaces between USSs partially overlap.

FIG. 19C illustrates a method of detecting the DCI for the self-scheduling CC in an overlapping section in case the search spaces between the USSs partially overlap with each other.

Referring to FIG. 19C, in the case of a section where the search spaces of the USS for CC #1 and the USS for CC #2 partially overlap with each other, the UE determines that the DCI corresponding to self-scheduling is transmitted in the overlapping section, and performs blind decoding for a plurality of PDCCHs. As a result of the blind decoding, the UE receives downlink control information through the PDCCH corresponding to the self-scheduling which has succeeded in the decoding.

Figure 19D:
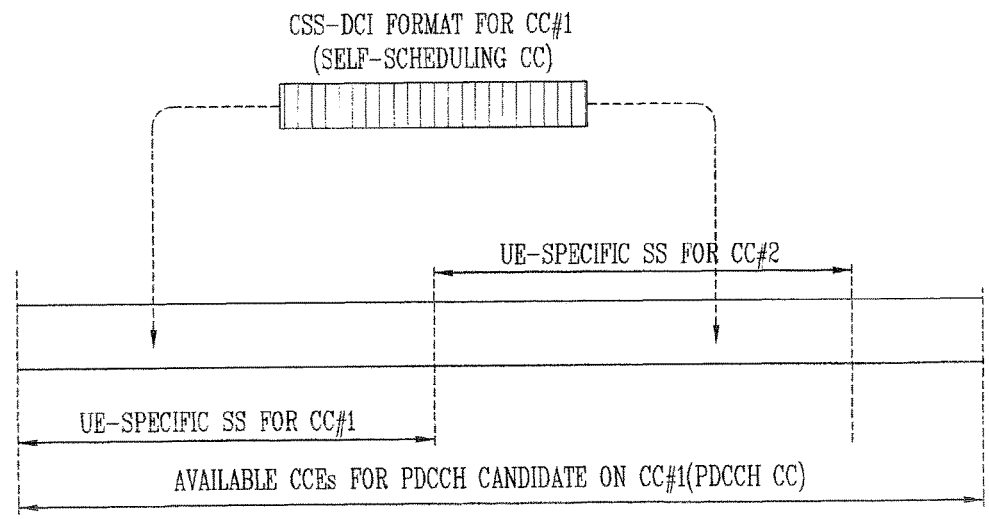
FIG. 19D illustrates a method for detecting a DCI for a self-scheduling CC in a shared section in case USSs of different CCs are shared

FIG. 19D illustrates a method of detecting a DCI for the self-scheduling CC in a shared section in the case of sharing the USSs of different CCs.

Referring to FIG. 19D, in case the search space of the USS for CC #1 is shared with the search space of the USS for CC #2, the UE determines that the DCI corresponding to the self-scheduling is transmitted in the shared section, and performs blind decoding for a plurality of candidate PDCCHs. As a result of the blind decoding, the UE receives downlink control information through the PDCCH corresponding to the self-scheduling which has succeeded in decoding.

Method 7: Detecting a DCI by Giving Priority to the Primary CC.

Method 7 is a method for resolving the DCI ambiguity by limiting the DCI, which is transmitted in the overlapping or shared PDCCH search space section, to the DCI for the primary CC.

Here, the primary CC may be defined for each of UEs, and in case one or more PDCCH monitoring CCs are allocated to the UE, the primary DL/UL CC may be defined for each PDCCH monitoring CC. The expression "primary CC" may be changed to another expression, but regardless of the expression, the DCI size ambiguity may be resolved by setting one of PDSCH/PUSCH CCs, which can perform scheduling in the PDCCH monitoring CC, to a primary CC, and using the same in the DCI priority setting.

The primary CC for each PDCCH monitoring CC may be set as the UL CC linked on the system setting with the PDCCH monitoring DL CC (because the PDSCH is transmitted as DL CC), the CC having the primary linkage with the PDCCH monitoring CC, or the DL/UL CC which is the object of the self-scheduling in the PDCCH monitoring CC, etc.

That is, according to method 7, the UE determines that the DCI, which has been detected in the overlapping or shared SS section, is a DCI for the primary CC, and thereafter receives a shared channel and performs the feedback process.

Method 8: Not Detecting DCI in a Section where the Search Spaces Overlap or are Shared.

Method 8 provides a method of not searching for a corresponding DCI in case ambiguity occurs due to equality of sizes of different DCIs as SSs overlap with each other when the UE decodes SSs.

For example, if the case of the DCI without CIF and the DCI with the CIF for other CCs have the same size, when performing a DCI search, the UE includes only the DCI without the CIF for other CCs in search candidate, and does not include the DCI with CIF for other CCs in the search candidates. As such, it is possible to prevent occurrence of ambiguity including the UE of the same length.

Here, whether the DCI with the CIF may be omitted from the search or the DCIs without the CIF would be included may be configured through signaling, or may be predefined (e.g., predefined selection).

According to the above methods 1 to 8, the DCI ambiguity occurs in an overlapping or shared search space as the CIF is not included in the DCI.

Hence, if the CIFs are all included in the DCIs of the fallback mode, the ambiguity problem does not occur in the UE SS. The same size DCI may be included in the common SS, but the RNTI value may be differently set for the DCI, and thus distinction is possible. However, in the case of a form that maintains Rel-8 mode, the DCIs of the same length may overlap with each other in the state in which the CIF is not attached.

For example, the DCIs corresponding to the fallback for different CCs may not include the CIF. In this case, both do not include the CIF, and there is no way to distinguish them. Hence, when defining the DCI without the CIF, it is desirable to define only the SS area where the SSs do not overlap with each other.

For example, when there is a DCI without CIF among DCIs for a specific CC, if the DCI without CIF for another CC overlaps with the SS (and the lengths of the DCIs are the same), the DCI without the CIF for the CC is decoded by giving priority to the SS for a specific CC, the DCI without the CIF for another CC is not defined in the overlapping search section. Further, the above described methods may be applied to the DCI without the CIF which is a problem.

If the SS, which uses the UE, is commonly defined for all CCs, there should be no ambiguity for sizes of the DCIs which should be searched for by the UE. To this end, the above defined methods may be applied. Further, if the sizes are the same only for the DCI without the CIF, the shared SSs may be defined in a disjointed manner and then use the defined SSs.

Here, in case the distinctive UE specific SS overlaps with the common SS where common channel information is transmitted, the area may be defined as where scheduling only DCIs for the same carrier. The CCs may be arbitrarily defined for other SSs.

Method 9: Bit Level Scrambling, Bit Level Reverse.

Method 9 is a method for resolving the DCI size ambiguity problem through bit level scrambling.

Method 9 may use bit level scrambling so that the USS may be distinguished from the CSS. For example, the scrambling code A for the USS and the scrambling code B for the CSS may be used.

Further, in a section where the SS of the self-scheduling PDCCH overlaps or is shared with the SS of the cross-scheduling PDCCH, the bit-level scrambling may be used so that the self-scheduling PDCCH without CIF can be distinguished from the cross-scheduling PDCCH with the CIF.

The scrambling code for the DCI with the CIF may be distinguished from the scrambling code for the DCI without the CIF, and may then be used.

The bit level scrambling may be applied in various steps such as 1) information bits (before CRC attachment), 2) information bits+CRC (after CRC attachment), and 3) after channel encoding.

Method 10: Removing SS for an Arbitrary DCI in a Section where DCI Size Ambiguity Occurs.

Method 10 illustrates a method for resolving the problem by removing the SS for the DCI with the CIF or the SS for the DCI without the CIF in the DCI ambiguity section in FIGS. 16A to 16D.

That is, the USS (or CSS) may be removed in a section where the CSS overlaps with the USS. Further, in a section where the SS for the self-scheduling DCI overlaps or is shared with the SS for the cross-scheduling DCI, the SS for the self-scheduling DCI or the SS for the cross-scheduling DCI may be set to be removed.

There should be a mutual promise between the UE and the base station to determine which DCI's SS is to be removed in the ambiguity section. Further, it is possible to be informed through signaling at the time of cross carrier scheduling activation.

In case the DCI with the CIF and the DCI without the CIF come to have the same payload size, the PDCCH DCI, which has been detected according to a promised or known rule, may be analyzed based on the DCI with the CIF or the DCI without the CIF.

Method 10 causes the same result as that of the above priority solution (methods 5 and 6), but the configuration is different.

However, in method 10, the blocking probability of the PDCCH may increase in terms of the DCI transmitted to the removed SS.

Method 11: Removing an SS for an Arbitrary DCI in a Section where the DCI Size Ambiguity Occurs and Sequentially Adding SSs by as Many as Removed.

Method 11 is a method for maintaining blocking probability which is a problem in method 10.

In the ambiguity section, the method of maintaining the SSs for one of DCIs with the same size and removing the SSs for the other DCIs is the same as that of method 10. In order to make the blocking probability same as that of the case where the SSs are not removed, the method of sequentially adding the removed SSs is suggested.

That is, when the CSS overlaps with the USS, the USSs of the overlapped portion may be removed, and new USSs may be sequentially added by as many as removed (indexing may be done in a circular manner), or the CSSs may be removed, and new CSSs may be sequentially added by as many as removed.

In a section where the SS for the self-scheduling DCI overlaps or is shared with the SS for the cross-scheduling DCI, the SSs for the self-scheduling DCI may be removed and new SSs for the self-scheduling DCI may be sequentially added by as many as removed, or the SSs for the cross-scheduling DCI may be removed and new SSs may be sequentially added by as many as removed.

At this time, the added SSs may be constituted in the CCE row outside the ambiguity section.

Method 12: Allocating an Exclusive SS, and Reflecting this Allocation in an SS Setting Parameter so that an Ambiguity Section is not Generated.

Method 12 is similar to methods 3 and 4. The CSS and the USS may be exclusively set, the SS of the self-scheduling DCI and the SS of the cross-scheduling DCI may be exclusively set, or the SS of the DCI with the CIF and the SS of the DCI without the CIF may be exclusively set.

In case the CSS and the USS are exclusively set, a value, which can always set the SS to be disjointed with the CSS, may be included in the USS setting parameter. Since the CSS is a SS, which always exists in a fixed location section, and thus a method of moving the USS is effective.

In case the SS of the self-scheduling DCI and the SS of the cross-scheduling DCI are exclusively set, a value, which can set the cross-scheduling DCI SS to be always disjointed with the self-scheduling DCI SS, may be included in the cross-scheduling SS setting parameter. The same is applied to the SS of the DCI with the CIF and the SS of the DCI without the CIF.

For example, the value may be a parameter indicating shifting or hopping, etc.

Here, a parameter for exclusively setting the SS is not always a fixed value, but may be set to a different value every time according to the configuration of the SS.

Method 13: Method of Resolving the Ambiguity Problem Through x-Bit (e.g., x=1) Indication in the DCI.

In order to resolve the DCI size ambiguity problem, a bit, which gives information about the DCI, may be added to the DCI.

For example, 1 bit indication about whether the DCI is a DCI to be transmitted to the USS or to the CSS may be given to the DCI. Further, whether the DCI is a self-scheduling DCI or a cross-scheduling DCI and whether the DCI is a DCI with the CIF or a DCI without the CIF may be notified through the x-bit indication in the DCI format, and thus the UE may perform PDCCH decoding without size ambiguity.

Here, since may recognize whether the DCI is a DCI with the CIF only if the UE can determine the bit at a fixed position, and thus the x-bit indication should be set to be transmitted to a position always fixed on the DCI payload.

A fixed position means an always fixed position regardless of the DCI size. For example, the forefront x-bit and the very last x-bit may be used.

Method 14: A Method of Solving a Problem Through Puncturing in a DCI Transmitted to a Section where the DCI Size Ambiguity Occurs.

Method 14 is a method of solving a problem by differentiating DCI sizes by bit puncturing among one or more DCIs transmitted to the ambiguity section.

In case the SSs of the USS and the CSS overlap with each other, in a DCI transmitted in a USS transmitted to an overlapping SS section (or a DCI transmitted in the CSS, but it appears to be more reasonable to puncture the DCI transmitted in the U), at least one bit is punctured. For example, in the case of one bit puncturing, after CRC-encoding an information bit, one of 16 bits of the CRC is punctured. That is, if the information bit is 24 bits, it should originally be 40 bits, but it becomes 39 bits due to the CRC puncturing. Channel encoding is performed with this.

In a cross-scheduling DCI (or self-scheduling DCI) transmitted in a section where the SS of the self-scheduling DCI overlaps or is shared with the SS of the cross-scheduling DCI, at least one bit is punctured.

When transmitted in an SS where the DCI with the CIF and the DCI without the CIF overlap or are shared, at least one bit may be set to be punctured in a DCI with the CIF (or the DCI without the CIF). In this case, the probability of false detection is increased by ½.

Figure 20:
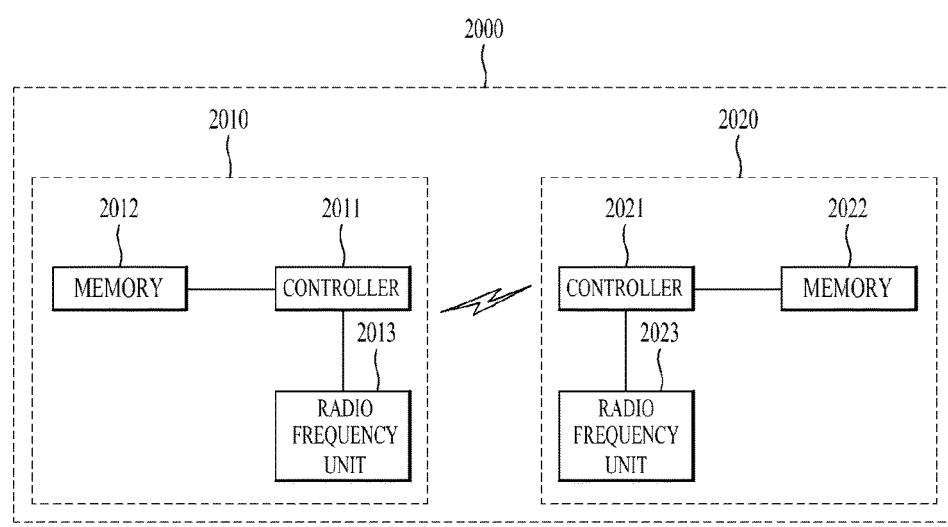
FIG. 20 is a block diagram illustrating a radio communication system according to an embodiment of the present invention.

FIG. 20 is a block diagram illustrating a radio communication system according to an exemplary embodiment of the present invention.

A base station 2010 includes a controller 2011, a memory 2012, and a radio frequency (RF) unit 2013.

The controller 2011 implements suggested functions, processes and/or methods. Layers of the radio interface protocol may be implemented by the controller 2011.

The controller 2011 may control to operate carrier aggregation and to transmit the PDCCH corresponding to the CSS or the PDCCH without the CIF in a section where the PDCCH search space overlaps or is shared.

The memory 2012 is linked to the controller 2011, and stores a protocol or a parameter for carrier junction. The RF unit 2013 is linked to the controller 2011, and transmits and/or receives radio signals.

A UE 2020 includes a controller, a memory 2022, and a radio frequency (RF) unit 2023.

The controller 2012 implements suggested functions, processes and/or methods. The layers of the radio interface protocol may be implemented by the controller 2021. The controller 2021 may control to operate the carrier junction and to receive the PDCCH corresponding to the CSS or the PDCCH without the CIF in a section where the PDCCH search spaces overlap or are shared.

The memory 2012 is linked with the controller 2021, and stores a protocol or a parameter for carrier junction operation. The RF unit 2013 is linked with the controller 2021, and transmits and/or receives radio signals.

The controllers 2011 and 2021 may include an application-specific integrated circuit (ASIC), another chipset, logic circuit and/or data processing apparatus. The memories 2012 and 2022 may include a read-only memory (ROM), a random access memory (RAM), a flash memory, a memory card, a storage medium and/or other storage devices. The RF units 2013 and 2023 may include a baseband circuit for processing radio signals. When an exemplary embodiment is implemented by software, the above described scheme may be implemented as a module (process, function, etc.) which performs the above described function. The module may be stored in memories 2012 and 2022 and may be executed by the controllers 2011 and 2021. The memories 2012 and 2022 may be positioned inside or outside the controller 2011 and 2021, and may be connected with the controllers 2011 and 2021 in various well-known manners.

What is claimed is:

1. A method for receiving a downlink control information (DCI) from a base station (BS) by a user equipment (UE) in a wireless communication system, the method comprising:
monitoring, by the UE, a plurality of Physical Downlink Control Channel (PDCCH) candidates having a cyclic redundancy check (CRC) scrambled by a cell radio network temporary identifier (C-RNTI) and having a same payload size in a common search space and a UE-specific search space on a primary cell to receive the DCI from the BS,
wherein the common search space and the UE-specific search space are overlapped;
when the UE is configured with a carrier indicator field (CIF), determining, by the UE, that only a PDCCH in the common search space is transmitted by the BS from among the plurality of PDCCH candidates; and receiving, by the UE, a Physical Downlink Shared Channel (PDSCH) corresponding to the PDCCH in the common search space.

2. The method according to claim 1, wherein the DCI carried by a PDCCH candidate in the UE-specific search space includes a CIF, and the DCI carried by a PDCCH candidate in the common search space does not include a CIF.

3. The method according to claim 1, wherein an aggregation level of a PDCCH candidate in the common search space is the same as an aggregation level of a PDCCH candidate in the UE-specific search space.

4. The method according to claim 1, wherein the DCI carried by a PDCCH candidate in the common search space has at least one different DCI field from DCI fields of the DCI carried by a PDCCH candidate in the UE-specific search space.

5. The method according to claim 1, wherein the monitoring the plurality of PDCCH candidates includes performing a blind decoding for the plurality of PDCCH candidates, and the blind decoding includes performing CRC de-scrambling for each of the plurality of PDCCH candidates using a radio network temporary identifier (RNTI).

6. A user equipment (UE) configured to receive a downlink control information (DCI) from a base station (BS) in a wireless communication system, the UE comprising:

a radio frequency (RF) unit that transmits and receives a radio signal; and a controller operably coupled with the RF unit, wherein the controller:

monitors a plurality of Physical Downlink Control Channel (PDCCH) candidates having a cyclic redundancy check (CRC) scrambled by a cell radio network temporary identifier (C-RNTI) and having a same payload size in a common search space and a UE-specific search space on a primary cell to receive the DCI from the BS, wherein the common search space and the UE-specific search space are overlapped, when the UE is configured with a carrier indicator field (CIF), determines that only a PDCCH in the common search space is transmitted by the BS from among the plurality of PDCCH candidates, and receives a Physical Downlink Shared Channel (PDSCH) corresponding to the PDCCH in the common search space.

7. The UE according to claim 6, wherein the DCI carried by a PDCCH candidate in the UE-specific search space includes a CIF, and the DCI carried by a PDCCH candidate in the common search space does not include a CIF.

8. The UE according to claim 6, wherein an aggregation level of a PDCCH candidate in the common search space is the same as an aggregation level of a PDCCH candidate in the UE-specific search space.

9. The UE according to claim 6, wherein the DCI carried by a PDCCH candidate in the common search space has a different DCI field from DCI fields of the DCI carried by a PDCCH candidate in the UE-specific search space.

10. The UE according to claim 6, wherein the controller further performs a blind decoding for the plurality of PDCCH candidates, and the blind decoding includes performing CRC de-scrambling for each of the plurality of PDCCH candidates using a radio network temporary identifier (RNTI).

* * * * *